(12) United States Patent
Ott

(10) Patent No.: US 12,055,667 B2
(45) Date of Patent: Aug. 6, 2024

(54) OPTICAL RANGE CALCULATION APPARATUS AND METHOD OF EXTENDING A MEASURABLE RANGE

(71) Applicant: Melexis Technologies NV, Tessenderlo (BE)

(72) Inventor: Andreas Ott, Erfurt (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 305 days.

(21) Appl. No.: 17/160,724

(22) Filed: Jan. 28, 2021

(65) Prior Publication Data

US 2021/0239810 A1 Aug. 5, 2021

(30) Foreign Application Priority Data

Jan. 30, 2020 (EP) .................................... 20154704

(51) Int. Cl.
*G01C 3/08* (2006.01)
*G01S 7/32* (2006.01)
(Continued)

(52) U.S. Cl.
CPC .............. *G01S 7/4913* (2013.01); *G01S 7/32* (2013.01); *G01S 7/4808* (2013.01)

(58) Field of Classification Search
None
See application file for complete search history.

(56) References Cited

U.S. PATENT DOCUMENTS 9,325,920 B2 * 4/2016 Van Nieuwenhove ...................... G01S 7/4865
10,024,966 B2 7/2018 Patil
(Continued)

FOREIGN PATENT DOCUMENTS

| DE | 102013214677 B3 * | 10/2014 | ............. G01S 17/36 |
|---|---|---|---|
| DE | 102013214677 B3 | 10/2014 | |
| WO | WO 2020037167 A1 * | 2/2020 | ........... G01S 7/4915 |

OTHER PUBLICATIONS

Adrian P. P. Jongenelen et al., "Analysis of Errors in ToF Range Imaging With Dual-Frequency Modulation" IEEE Transactions on Instruments and Measurement, vol. 60, No. 5 (May 2011) pp. 1861-1868.
(Continued)

*Primary Examiner* — Mark Hellner
(74) *Attorney, Agent, or Firm* — Harness, Dickey & Pierce, P.L.C.

(57) ABSTRACT

An apparatus (100) comprises a light source that emits light modulated selectively at first and second modulation frequencies. A photonic mixer cell (102) generates and stores a plurality of electrical output signals respectively corresponding to phase offset values applied in accordance with an indirect time of flight technique and in respect of the selected modulation frequency. A signal processing circuit processes a first number of the electrical output signals at the first modulation frequency to calculate a first measurement phase angle ($\varphi_1$) from a calculated first measurement vector, and a second number of the electrical output signals at the second modulation frequency to calculate a second measurement phase angle ($\varphi_2$) from a second calculated measurement vector. A phase angle difference ($\Delta\varphi$) between the first and second measurement phase angles ($\varphi_1$, $\varphi_2$) is then calculated and a correction value ($\varphi_{corr}$) applied to the phase angle difference ($\Delta\varphi$) to yield an extended range phase angle ($\varphi_{ext}$) for calculating a range.

20 Claims, 11 Drawing Sheets

(51) Int. Cl.
   *G01S 7/48* (2006.01)
   *G01S 7/4913* (2020.01)

(56) References Cited

U.S. PATENT DOCUMENTS

| | | | |
|---|---|---|---|
| 2016/0116594 A1 | 4/2016 | Xu et al. | |
| 2016/0123720 A1* | 5/2016 | Thorpe | G01B 9/02004 |
| | | | 356/498 |
| 2020/0278432 A1* | 9/2020 | Thorpe | G01S 7/4911 |
| 2020/0349728 A1* | 11/2020 | Bitan | G06T 7/521 |

OTHER PUBLICATIONS

European Search Report dated Jul. 8, 2020.

* cited by examiner

OPTICAL RANGE CALCULATION APPARATUS AND METHOD OF EXTENDING A MEASURABLE RANGE

FIELD

The present invention relates to an optical range calculation apparatus of the type that, for example, employs an indirect time of flight measurement technique. The present invention also relates to a method of extending a measurable range, the method being of the type that, for example, measures ranges using an indirect time of flight measurement technique.

BACKGROUND

In so-called time-of-flight sensing systems and other systems, for example gaming console vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken, each sample being phase stepped by, for example, 90°. Using this illumination and sampling approach, a phase angle between illumination and reflection can be determined, and the determined phase angle can be used to determine a distance to the reflecting feature of the scene.

In iToF systems, high frequency signal processing (demodulation) occurs at the pixel level, and so the signal bandwidth post-pixel required to integrate a large number of pixels on the same chip is low. Consequently, iToF systems can support a larger number of channels and hence higher spatial resolution measurement than direct ToF systems. However, iToF systems have limited distance measurement capabilities. In this regard, to achieve low stochastic distance measurement errors, iToF systems require high modulation frequencies, which in turn lowers the distance range that can be measured unambiguously. For example, a 100 MHz modulation frequency results in an approximate unambiguous measurement range of 1.5 m.

As explained above, iToF systems sample in respect of different applied phases. A typical iToF system comprises a buffer that stores analogue signals generated by a so-called photonic mixer device in respect of m phases employed for subsequent signal processing. A discrete Fourier transformation unit calculates a fundamental frequency of a complex signal stored by the buffer in terms of in-phase and quadrature components of the signals. Using the values of the in-phase and quadrature components, a phase angle of the complex signal and the amplitude can be estimated and the distance to an object can be solved using the estimated phase angle information.

However, such amplitude modulated continuous wave type systems suffer from an inherent depth ambiguity owing to the detectable phase angle information being constrained by the modulation frequency of the illuminating light signal. In this regard, a period of the modulated illuminating light equates to a full phase of $2\pi$. Consequently, a reflecting object at a distance from the source of illumination resulting in a time-of-flight beyond the period of the modulated illumination signal nevertheless appears in the distance range bounded by the period of the modulated illumination signal and hence the modulation frequency thereof. This effect is called distance aliasing. Objects that are located in the so-called "unambiguous range" defined by the period of the modulated illumination signal can be detected correctly, but objects beyond the unambiguous range are aliased back to within the unambiguous range and are therefore detected at an erroneous distance. As mentioned above, the unambiguous measurable range (UR) of the system is determined by the modulation frequency of the illuminating continuous wave light signal:

$$UR = \frac{c}{2f_{mod}} \tag{1}$$

where c is the speed of light and $f_{mod}$ is the modulation frequency of the illuminating continuous wave light signal.

From equation (1) above, it therefore follows that the unambiguous measurable range can be increased by reducing the modulation frequency, thereby adapting the unambiguous measurable range so that more objects in the scene can be detected. However, the precision of the range measured depends upon a signal-to-noise ratio of the estimated phase angle, $SNR_\phi$. In this respect, the signal-to-noise ratio of the estimated phase angle, $SNR_\phi$, affects the ability of the system to resolve objects with a predetermined resolution, which is given by the following expression:

$$\Delta d_{x,y} = \frac{c}{2f_{mod}SNR_\phi} = \frac{UR}{SNR_\phi} \tag{2}$$

As can be seen from equation (2) above, if improved resolution is required, the modulation frequency has to be increased, but this conflicts with the desire to reduce the modulation frequency to increase the unambiguous measurable range. It is therefore desirable to de-alias measurements of object ranges that fall outside the unambiguous measurable range of the system as a way of increasing the unambiguous measurable range without detrimentally affecting the signal-to-noise ratio.

"Analysis of errors in ToF Range Imaging With Dual-frequency Modulation" (Jongenelen et al., IEEE Transactions on Instrumentation and Measurement, Volume 60, Issue 5, May 2011, pages 1861 to 1868) proposes a technique employing two modulation frequencies to de-alias range measurements using a multiplicative inverse to determine a pair of aliases respectively associated with the two modulation frequencies. However, this computation requires a level of processing power that is not cost-effective for a ToF system of this kind.

DE-B3-102013214677 discloses an alternative de-aliasing technique that also employs two modulation frequencies, but calculates a difference between two aliased distance estimates and then uses a lookup table to identify the correct alias in respect of a given modulation frequency of choice.

U.S. Pat. No. 10,024,966 discloses another de-aliasing technique, which performs de-aliasing in the phase angle domain by calculating a weighted phase difference between two phase angles. Each phase angle used is pre-weighted by a respective predetermined weighting factor. However, as with the other above-described de-aliasing techniques, at least one multiplication operation has to be performed, which is computationally expensive and increases demand of existing limited processing resources of the ToF system.

SUMMARY

According to a first aspect of the present invention, there is provided an optical range calculation apparatus comprising: a light source configured to emit light in accordance with an indirect time of flight measurement technique, the light source being configured to modulate the light selectively at a first modulation frequency and a second modulation frequency in accordance with a predetermined frequency selection scheme; a photonic mixer cell configured to generate and store a plurality of electrical output signals respectively corresponding to phase offset values applied in accordance with the indirect time of flight measurement technique and in respect of the selected modulation frequency; and a signal processing circuit configured to process a first number of the plurality of electrical output signals in respect of the first modulation frequency in order to calculate a first measurement vector and a first measurement phase angle from the first measurement vector and to process a second number of the plurality of electrical output signals in respect of the second modulation frequency in order to calculate a second measurement vector and a second measurement phase angle from the second measurement vector; wherein the signal processing circuit is configured to calculate a phase angle difference between the first and second measurement phase angles and apply a correction value to the phase angle difference to yield an extended range phase angle; and the signal processing circuit is configured to calculate a de-aliased range using the extended range phase angle.

The signal processing circuit may be configured to apply the correction value in response to a comparison of respective aliasing parameters associated with the first modulation frequency and the second modulation frequency.

The signal processing circuit may be configured to compare the first modulation frequency with the second modulation frequency.

The apparatus may further comprise: a first unambiguous measurable range associated with the first measurement phase angle; and a second unambiguous measurable range associated with the second measurement phase angle; wherein the signal processing circuit may be configured to compare the first unambiguous measurable range with the second unambiguous measurable range.

Calculation of the correction value may be dependent upon an outcome of the comparison of the respective aliasing parameters.

The signal processing circuit may be configured to detect wrapping of the phase angle difference by comparison of the phase angle difference with a phase angle wrapping threshold.

The signal processing circuit may be configured to quantise the first measurement phase angle as a first n-bit value and to quantise the second measurement phase angle as a second n-bit value; the first and second n-bit values may be within an n-bit space representing an angular range between substantially 0 and substantially $2\pi$ over the n-bit space; and the signal processing circuit may be configured to calculate the phase angle difference and to apply the correction value to the phase angle difference simultaneously by performing a subtraction operation using the quantised first measurement phase angle and the quantised second measurement phase angle.

The signal processing circuit may be configured to select the first measurement phase angle or the second measurement phase angle as a minuend of the subtraction operation depending upon the value of the outcome of the comparison of respective aliasing parameters.

The extended range phase angle may have an unambiguous extended range associated therewith; and the signal processing circuit may be configured to calculate the range using the extended range phase angle by scaling the unambiguous extended range using the extended range phase angle.

The signal processing circuit may be configured to transform the first measurement phase angle having a first unambiguous measurable range associated therewith to a refined extended phase angle having an extended unambiguous measurable range associated with the extended range phase angle.

The signal processing circuit may be configured to transform the first measurement phase angle to the corresponding refined extended phase angle by compressing multiplicatively the first measurement phase angle, and additively translating the compressed first measurement phase angle, thereby unwrapping the compressed first measurement phase angle.

A compression ratio used to compress the first measurement phase angle may be a constant of proportionality; and the signal processing circuit may be configured to calculate the constant of proportionality by evaluating a ratio of the first unambiguous measurable range to the extended unambiguous measurable range.

The signal processing circuit may be configured to calculating a wrap repeat number of the first measurement phase angle using a difference between the compressed first measurement phase angle and the extended range phase angle; and the signal processing circuit may be configured to unwrap the compressed first measurement phase angle using the wrap repeat number.

The signal processing circuit may be configured to unwrap the first measurement phase angle by adding a scaled translation value based upon the wrap repeat number, and an uppermost angular range value scaled by the constant of proportionality.

The signal processing circuit may be configured to transform the first measurement phase angle having a first unambiguous measurable range associated therewith to a first refined extended phase angle having a first extended unambiguous measurable range associated with the extended range phase angle; the signal processing circuit may also be configured to transform the second measurement phase angle having a second unambiguous measurable range associated therewith to a second refined extended phase angle having a second extended unambiguous measurable range associated with the extended range phase angle; and the signal processing circuitry may be configured to calculate an average of the first and second refined extended phase angles.

The signal processing circuit may be configured to transform the first and second measurement phase angles to the corresponding first and second refined extended phase angles by respectively compressing multiplicatively the first and second measurement phase angles, and additively translating the compressed first and second compressed measurement phase angles, respectively, thereby unwrapping the first and second compressed measurement phase angles.

The signal processing circuit may be configured to sum the first and second measurement phase angles prior to transforming the summed first and second measurement phase angles to a refined extended phase angle having an extended unambiguous measurable range associated with the extended range phase angle.

The signal processing circuit may be configured to transform the sum of first and second measurement phase angles to the corresponding refined extended phase angle by compressing multiplicatively the sum of the first and second measurement phase angles, and additively translating the compressed sum of the first and second measurement phase angles, thereby unwrapping the compressed sum of the first and second measurement phase angles.

A compression ratio used to compress the sum of the first and second measurement phase angles may be a constant of proportionality; and the signal processing circuit may be configured to calculate the constant of proportionality by calculating a combined unambiguous measurable range in respect of the sum of the first and second measurement phase angles and evaluating a ratio of the calculated combined unambiguous measurable range to the extended unambiguous measurable range.

According to a second aspect of the invention, there is provided a method of extending a measurable range of an optical range calculation apparatus, the method comprising: a light source emitting light in accordance with an indirect time of flight measurement technique, the light source modulating the light selectively at a first modulation frequency and a second modulation frequency in accordance with a predetermined frequency selection scheme; a photonic mixer cell generating and storing a plurality of electrical output signals respectively corresponding to phase offset values applied in accordance with the indirect time of flight measurement technique and in respect of the selected modulation frequency; and a signal processing circuit processing a first number of the plurality of electrical output signals in respect of the first modulation frequency in order to calculate a first measurement vector and a first measurement phase angle from the first measurement vector and processing a second number of the plurality of electrical output signals in respect of the second modulation frequency in order to calculate a second measurement vector and a second measurement phase angle from the second measurement vector; wherein the signal processing circuit calculates a phase angle difference between the first and second measurement phase angles and applies a correction value to the phase angle difference to yield an extended range phase angle; and the signal processing circuit calculates a de-aliased range using the extended range phase angle.

According to a third aspect of the invention, there is provided a method of extending a measurable range of an optical range calculation apparatus, the method comprising: emitting light in accordance with an indirect time of flight measurement technique, modulating the light selectively at a first modulation frequency and a second modulation frequency in accordance with a predetermined frequency selection scheme; generating and storing a plurality of electrical output signals respectively corresponding to phase offset values applied in accordance with the indirect time of flight measurement technique and in respect of the selected modulation frequency; and processing a first number of the plurality of electrical output signals in respect of the first modulation frequency in order to calculate a first measurement vector and a first measurement phase angle from the first measurement vector and processing a second number of the plurality of electrical output signals in respect of the second modulation frequency in order to calculate a second measurement vector and a second measurement phase angle from the second measurement vector; calculating a phase angle difference between the first and second measurement phase angles and applying a correction value to the phase angle difference to yield an extended range phase angle; and calculating a de-aliased range using the extended range phase angle.

It is thus possible to provide an apparatus and method that mitigates the limits of detectable ranges attributable to the aliasing effects inherent to indirect time of flight measurement techniques. In this regard, the apparatus and method enables phase angle measurements to be generated that correspond to longer detection ranges. The method and apparatus can also be implemented using simple computational techniques, thereby avoiding time, cost and energy penalties of computationally intensive techniques. Furthermore, the apparatus and method achieves anti-aliasing, but not at the expense of the signal to noise ratio of the phase angles calculated.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
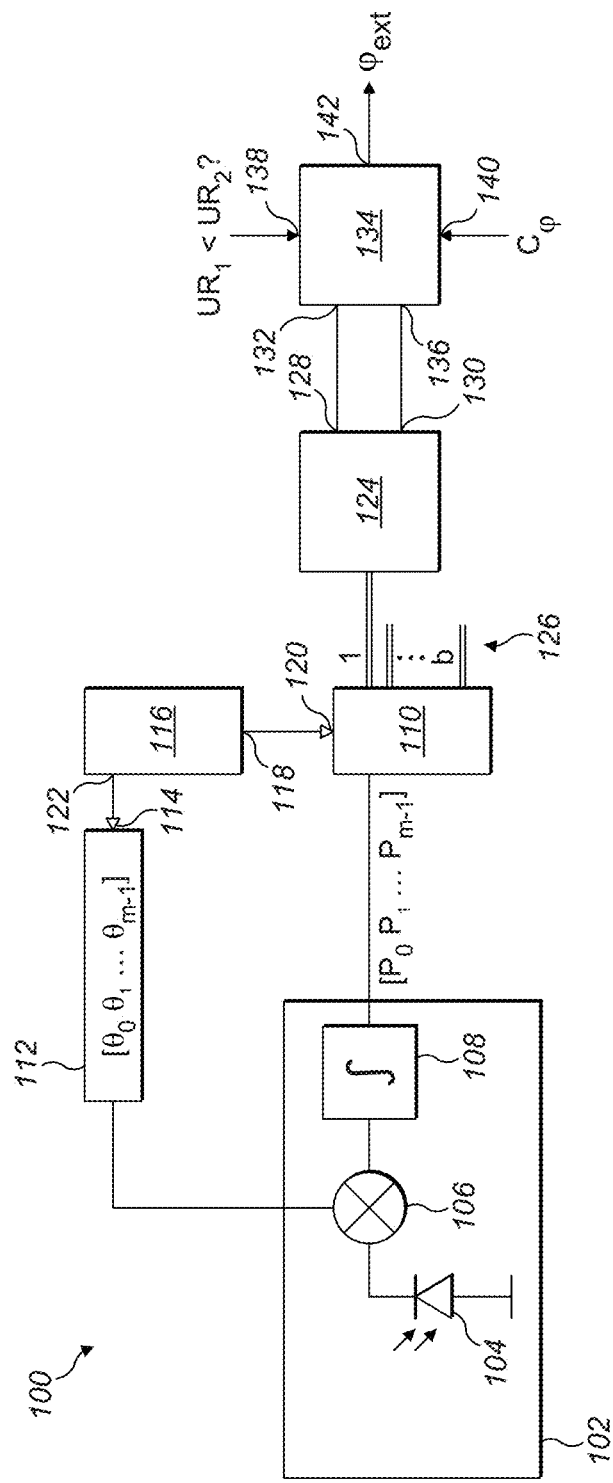
FIG. 1 is a schematic diagram of an optical range calculation apparatus constituting an embodiment of the invention.

Throughout the following description, identical reference numerals will be used to identify like parts.

Referring to FIG. 1, an indirect time of flight range calculation apparatus 100 comprises a source of electromagnetic radiation (not shown), for example a Laser Diode (LD) or a Light Emitting Diode (LED). In this example, the source of electromagnetic radiation is infrared light that is amplitude modulated in accordance with an indirect time of flight measurement technique so as to be emitted as a continuous wave optical signal. A detection and ranging module of the apparatus 100 comprises an optical receiver photonic mixer pixel device 102, the optical receiver photonic mixer pixel device 102 comprising a photodiode 104 having an anode operably coupled to ground potential and a cathode coupled a first input of a photonic mixer 106, an output of the photonic mixer 106 being coupled to an input of an integrator 108. In this example, a single photonic mixer pixel device 102 is being described for the sake of conciseness and clarity of description. However, the skilled person will appreciate that the detection and ranging module comprises an array of photonic mixer pixel devices of the kind described above.

A phase signal generator 112 is configured to generate a continuous wave electrical signal. The phase offset of the continuous wave signal is selectable via a control input 114, the phase of the continuous wave signal being selectable from a set of phase offsets: $[\theta_0, \theta_1, \ldots, \theta_{m-1}]$. An output of the phase signal generator 112 is coupled to a second input of the photonic mixer 106.

An output of the integrator 108 is coupled to an input of a Digital Fourier Transform (DFT) unit 110. The DFT unit 110 is supported by signal processing circuitry (not shown) of the apparatus 100. In this respect, phase angle measurements are transferred serially to the DFT unit 110, thereby reducing memory requirements for the detection and ranging module. The DFT unit 110 comprises internal buffers (not shown) to support serial transfer of measurements from the integrator 108. In order to support this arrangement, the DFT unit 110 is operably coupled to a timing control unit 116 supported by the signal processing circuitry to maintain synchronisation of data processing.

The timing control unit 116 has a synchronisation output 118 operably coupled to a timing input 120 of the DFT unit 110. A control output 122 of the timing control unit 116 is coupled to the control input 114 of the phase signal generator 112.

The DFT unit 110 has a plurality of digital in-phase (I)/quadrature (Q) outputs 126. In this example, the DFT unit 110 comprises b pairs of digital I/Q outputs corresponding to different harmonics of measured signals. As the output of the integrator 108 is an accumulated charge and, in this example in the analogue domain, the output of the integrator 108 needs to be converted to the digital domain. This can be achieved, for example, by employing a photon counter as the integrator 108 or providing an analogue-to-digital converter before the DFT unit 110.

A first pair of I/Q outputs of the plurality of digital I/Q outputs 126, relating to the first harmonic of received reflected optical signals, is coupled to a phase angle calculation unit, for example an arctan unit 124, supported by the signal processing circuitry. In this example, the arctan unit 124 comprises a frame buffer (not shown), which receives serially calculated phase angles and provides pairs of calculated phase angles at a first phase angle output 128 and a second phase angle output 130 thereof, although it should be appreciated that the frame buffer can in other examples be separate from the arctan unit 124. The first phase angle output 128 is coupled to a first phase angle input 132 of a range de-aliasing unit 134 also supported by the signal processing circuitry. The second phase angle output 130 is coupled to a second phase input 136 of the range de-aliasing unit 134. The range de-aliasing unit 134 also comprises an unambiguous range comparison result input 138 and a threshold input 140. The range de-aliasing unit 134 further comprises an extended phase angle output 142.

Figure 2:
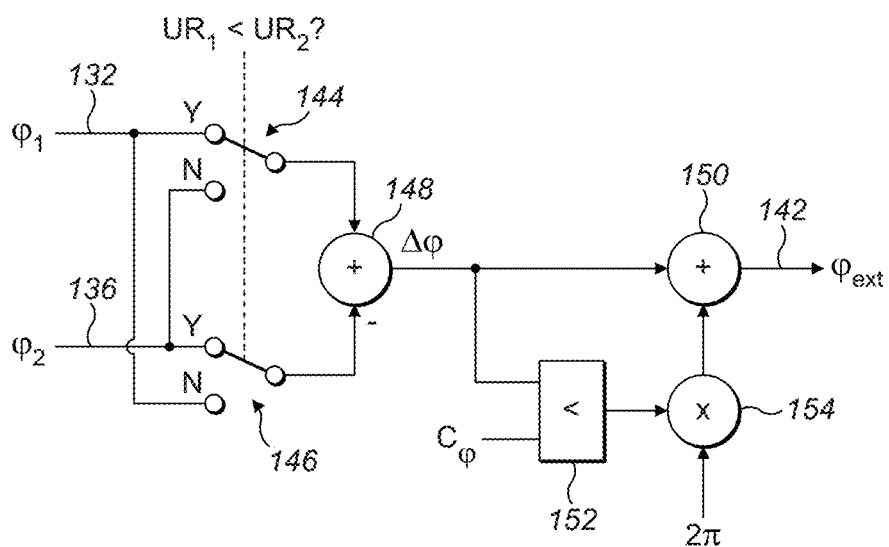
FIG. 2 is a schematic diagram of a de-aliasing unit of FIG. 1.

Turning to FIG. 2, the range de-aliasing unit 134 comprises a first input selector 144 having a first input, a second input and an output. The range de-aliasing unit 134 also comprises a second input selector 146 also having a first input, a second input and an output. The first input of the first input selector 144 is coupled to the first phase angle input 132 of the range de-aliasing unit 134, and the second input of the first input selector 144 is coupled to the second phase angle input 136. The first input of the second input selector 146 is coupled to the second phase angle input 136, and the second input of the second input selector 146 is coupled to first phase angle input 132. The first and second input selectors are coupled to the unambiguous range comparison result input 138. The output of the first input selector 144 is coupled to a first, positive, input of a first summation unit 148, and the output of the second input selector 146 is coupled to a second, negative, input of the first summation unit 148. An output of the first summation unit 148 is coupled to a first input of a second summation unit 150. The output of the first summation unit 148 is also coupled to a first input of a comparator 152. A second input of the comparator 152 is coupled to the threshold input 140 of the range de-aliasing unit 134. An output of the comparator is coupled to a first input of a first multiplier unit 154, a second input of the first multiplier unit 154 being coupled to a source (not shown) providing a constant $2\pi$ output value. An output of the first multiplier unit 154 is coupled to a second input of the second summation unit 150, an output of the second summation unit 150 being coupled to the extended phase angle output 142 of the range de-aliasing unit 134.

Figure 3:
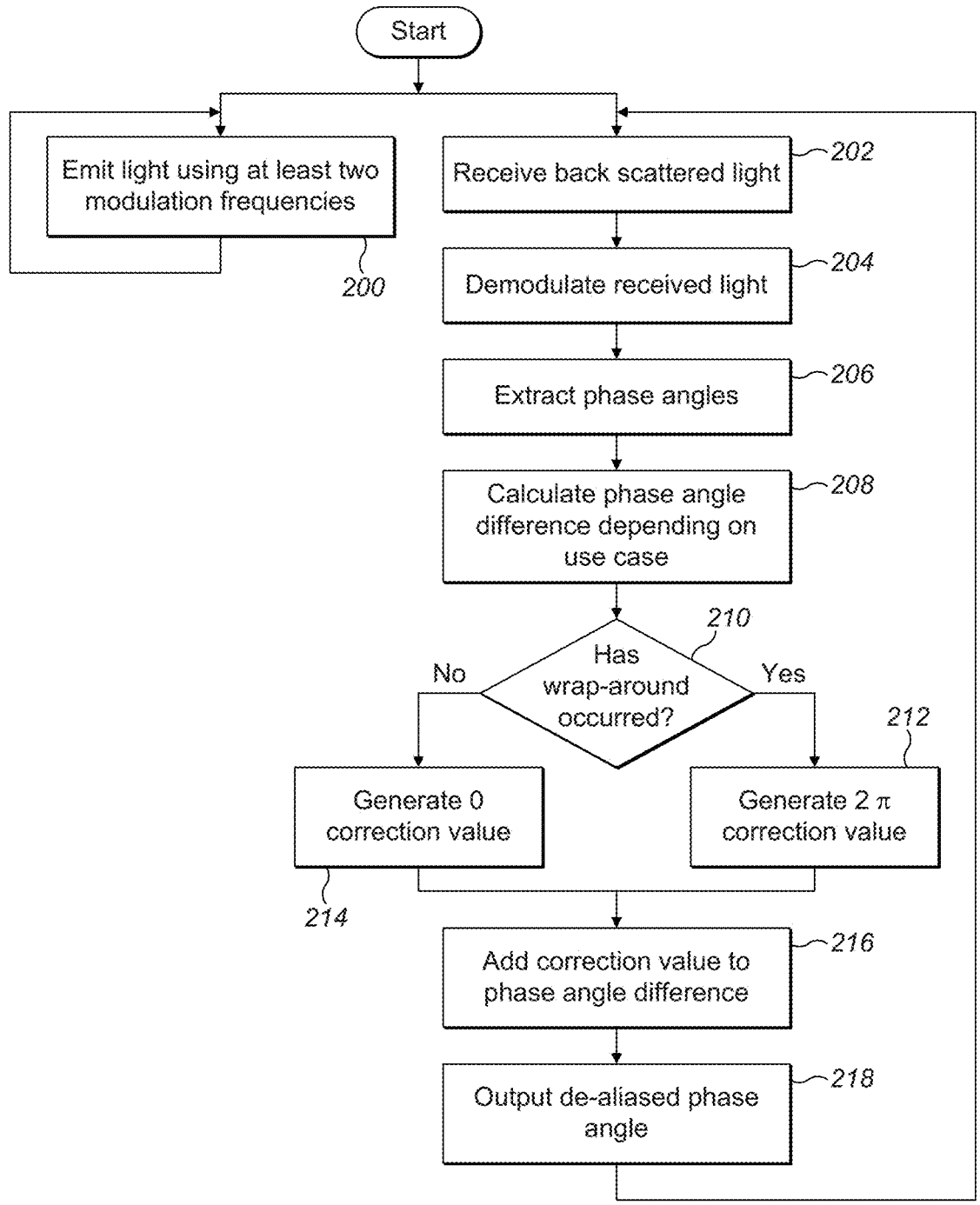
FIG. 3 is a flow diagram of a method of extending a measurable range performed by the apparatus of FIGS. 1 and 2 and constituting another embodiment of the invention.

In operation (FIG. 3), the light source emits (Step 200) continuous wave optical signals that illuminate a scene. In this example, the light source emits an alternating order of optical signals: a first optical signal at a first modulation frequency followed by a second optical signal at a second modulation frequency. The emission at the first and second modulation frequencies occurs over a time frame and, in this example, equally share the duration of the time frame. In this regard, the emission of the first optical signal at the first modulation frequency occurs over a first half of the time frame and the emission of the second optical signal at the second modulation frequency occurs over a second half of the time frame. This alternating pattern of emitted modulation frequencies repeats over subsequent time frames. The switching between modulation frequencies is controlled by the timing control unit 116.

At least one object in the scene, which for the same of simplicity will hereinafter be referred to as the object, reflects the optical signals emitted at the different modulation frequencies. In this regard, light at the first modulation frequency and light at the second modulation frequency are respectively backscattered from the object in the scene and some of the backscattered light is received (Step 202) by the photonic mixer pixel device 102.

The phase signal generator 112 generates a first continuous wave electrical signal at the first modulation frequency and a second continuous wave electrical signal at the second modulation frequency in synchronism with the timing of the emission of the first optical signal and the second optical signal. Again, the timing control unit 116 controls selection of the modulation frequency, but also cycling through the set of phase offsets applied to the first and second electrical signals. A synchronisation signal is also applied by the synchronisation output 118 to the DFT unit 110.

First light at the first modulation frequency backscattered by the object and incident upon the photonic mixer pixel device 102 is demodulated (Step 204) by applying the first electrical signal generated by the phase signal generator 112 to the photonic mixer 106. The phase offset of the first electrical signal is cycled through the set of phase offsets as mentioned above and digital representations of the charges are stored in the integrator 108, and therefore measured, in respect of each phase offset.

Following receipt of the first light by the photonic mixer 106, second light at the second modulation frequency backscattered by the object and incident upon the photonic mixer pixel device 102 is also demodulated (Step 204) by applying the second electrical signal generated by the phase signal generator 112 to the photonic mixer 106. The phase offset of the second electrical signal is cycled through the set of phase offsets as mentioned above and digital representations of the charges are stored in the integrator 108, and therefore measured, in respect of each phase offset.

The measurements of the first light received and the second light received therefore comprise, for each modulation frequency, a set of phase offset measurements, which are then received by the DFT unit 110 in series and converted to a pair of I/Q outputs constituting an I/Q vector (Step 204), V, representing the phase angle of the analogue electrical measurements in respect of the fundamental frequency of the received first light and subsequently the received second light. In this respect, the integrator 108 provides a plurality of phase-separated amplitude measurement outputs in series representing respective accumulated charge levels for applied phase offset values in respect of the photonic mixer pixel device 102. The DFT unit 110 calculates, for each frame cycle, first and second intermediate I and Q values for phase-separated amplitude measurements respectively received in series in respect of the received first light or the received second light, which are respectively accumulated over a frame (measurement) cycle to generate corresponding first and second I and Q value results. Operation of such an arrangement comprises respective vectors being calculated iteratively using the DFT unit 110 in respect of each associated incoming phase angle measurement. The DFT unit 110 can also generate other I/Q vectors in respect of harmonics of the charges measured by the integrator 108.

After the electrical measurement signals are converted to the frequency domain, the I- and Q-values for the fundamental frequency in respect of the received first light and then the received second light are provided by the DFT unit 110 at the outputs thereof. In this example, the synchronisation signal ensures that the fundamental frequency I/Q outputs of a current measurement frame of the DFT unit 110 are synchronously received by the arctan unit 124. The arctan unit 124 then, in accordance with the indirect time of flight measurement technique, calculates (Step 206) a first angle of the vector, $V_1$, in respect of the received first light constituting a first extracted (measured) calculated phase angle, $\varphi_1$, in the complex plane from the fundamental frequency I and Q values, and then a second angle of the vector, $V_2$, in respect of the received second light constituting a second extracted (measured) calculated phase angle, $\varphi_2$, in the complex plane from the fundamental frequency I and Q values. The first and second extracted phase angles, $\varphi_1$, $\varphi_2$, are respectively provided as outputs at the first and second phase angle outputs 128, 130.

The first and second extracted phase angles, $\varphi_1$, $\varphi_2$, are received by the range de-aliasing unit 134 in order to calculate an extended (range) phase angle, $\varphi_{ext}$. The calculated extended phase angle can then be used to calculate a de-aliased range using the known relationship between phase angle, unambiguous range and distance. The manner of calculation of the extended phase angle, $\varphi_{ext}$, is as follows.

Figure 4:
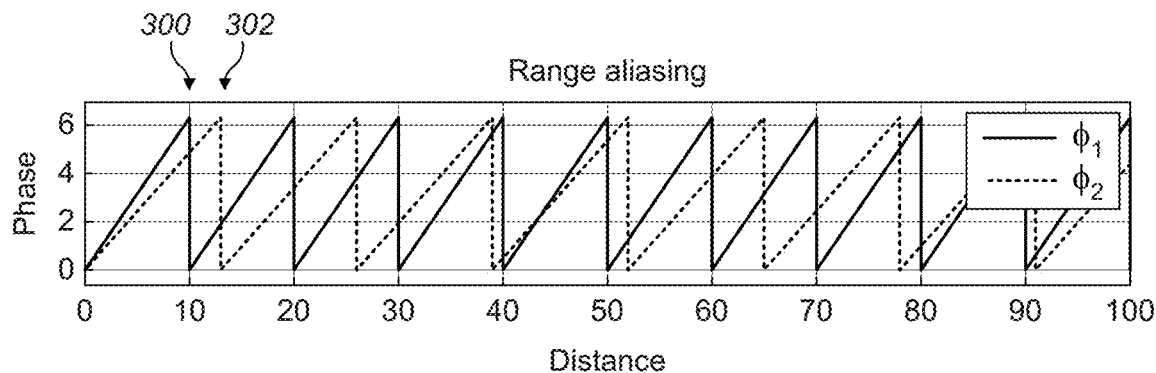
FIG. 4 is a graph of range aliasing under a first relative modulation frequency condition and prior to processing by the de-aliasing unit of FIG. 2.

As shown in FIG. 4, the first and second extracted phase angles, $\varphi_1$, $\varphi_2$, resolve different maximum ranges. The first extracted phase angle, $\varphi_1$, has a first wrap-around point 300, and the second extracted phase angle, $\varphi_2$, has a second wrap-around point 302. For a given photonic mixer pixel device, the difference between the phase angles, $\Delta\varphi$, is as follows.

$$\Delta \varphi = \varphi_1 - \varphi_2 = 2\pi \left( \frac{d}{UR_1} - k_1 - \frac{d}{UR_2} + k_2 \right) \quad (3)$$

where $UR_1$ is a first unambiguous range in respect of the first extracted phase angle, $\varphi_1$, $UR_2$ is a second unambiguous range in respect of the second extracted phase angle, $\varphi_2$, d is the range to the object being measured, and $k_1$ and $k_2$ are integer values representing the number of the respective alias. The first and second unambiguous ranges, $UR_1$, $UR_2$, constitute respective aliasing parameters used later herein. Rearranging equation (3) results in the following expression.

$$\frac{\Delta \varphi}{2\pi} = d \left( \frac{1}{UR_1} - \frac{1}{UR_2} \right) - \Delta k \quad (4)$$

It follows from equation (4) that the phase angle difference, $\Delta\varphi$, approaches zero at the boundary of the new, extended, unambiguous range, $UR_{ext}$:

$$UR_{ext} = \frac{c}{2|f_{mod_1} - f_{mod_2}|} \quad (5)$$

From equation (5), it is assumed that the phase angle difference, $\Delta\varphi$, is between $-2\pi$ and $+2\pi$, because each of the first and second extracted phase angles, $\varphi_1$, $\varphi_2$, is within 0 to $2\pi$. Furthermore, the phase angle difference, $\Delta\varphi$, is assumed to be monotonic with respect to the distance, d, within the extended unambiguous range, $UR_{ext}$.

From equation (5) above, two use cases exist: $f_{mod_1} > f_{mod_2}$, and $f_{mod_2} > f_{mod_1}$. It therefore follows from the relationship between modulation frequency and unambiguous range (equation (1)) that the two use cases can also be expressed in terms of unambiguous ranges: $UR_1 < UR_2$, and $UR_1 > UR_2$. As used hereinabove, it should also be appreciated that the modulation frequencies also constitute aliasing parameters.

Figure 5:
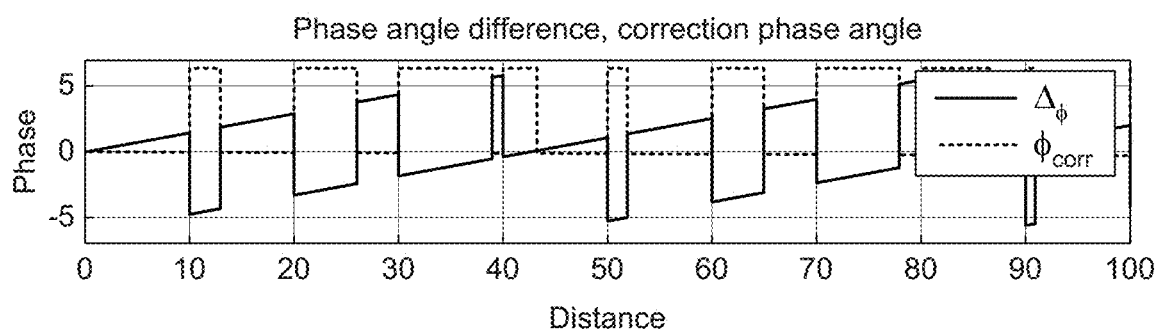
FIG. 5 is a graph of phase angle differences and correction phase angles under the first relative modulation frequency condition.
Figure 6:
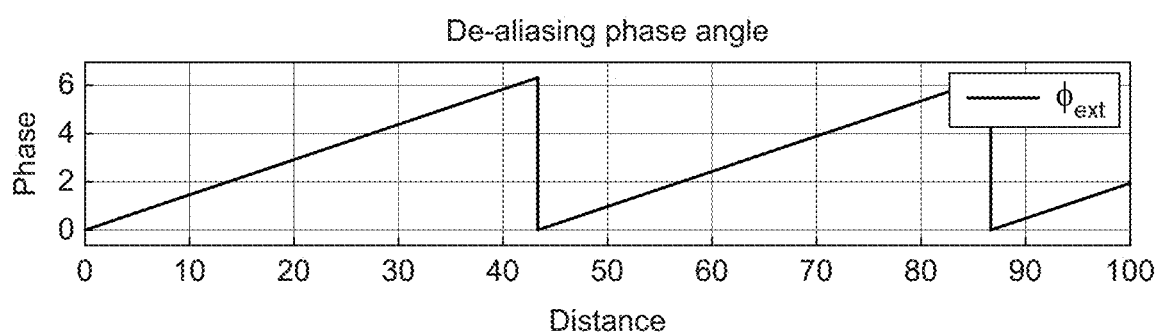
FIG. 6 is a graph of a de-aliased phase angle generated by the de-aliasing unit of FIG. 2 under the first relative modulation frequency condition.

FIGS. 4 to 6 relate to the first use case, where $UR_1$ is less than $UR_2$. Referring to FIG. 5, the phase angle difference, $\Delta\varphi$, increases with distance, d, over the extended unambiguous range, $UR_{ext}$, and $\Delta k$ of equation (4) tracks the difference in wrapping states of the first extracted phase angle, $\varphi_1$, and the second extracted phase angle, $\varphi_2$. $\Delta k$ therefore repeats or toggles its integer value in accordance with whether both or only one of the extracted phase angles has wrapped, In this example, $\Delta k$ is unity (positive), although the magnitude of $\Delta k$ can be greater than unity in other examples where the magnitude of the highest modulation frequency is more than twice the magnitude of the lowest modulation frequency employed. From FIG. 4, it can be seen that the first extracted phase angle, $\varphi_1$, wraps around before the second extracted phase angle, $\varphi_2$. As such, and referring back to FIG. 5, where the first extracted phase angle, $\varphi_1$, has wrapped, but the second extracted phase angle, ($\varphi_2$, has not yet wrapped, the phase angle difference, $\Delta\varphi$, is shifted by $-2\pi$. Consequently, using this information concerning the $-2\pi$ shift, the extended phase angle, $\varphi_{ext}$, is calculated as follows:

$$\varphi_{ext} = \begin{cases} \Delta\varphi, & \text{if } \Delta\varphi \geq 0 \\ \Delta\varphi + 2\pi, & \text{else} \end{cases} \quad (6)$$

The extended phase angle, $\varphi_{ext}$, is therefore calculated by applying a correction angle, $\varphi_{corr}$, to a calculated phase angle difference, $\Delta\varphi$, ($\varphi_{ext} = \Delta\varphi + \varphi_{corr}$), where the correction angle, $\varphi_{corr}$, is:

$$\varphi_{corr} = \begin{cases} 0, & \text{if } \Delta\varphi \geq 0 \\ 2\pi, & \text{else} \end{cases} \quad (7)$$

Figure 7:
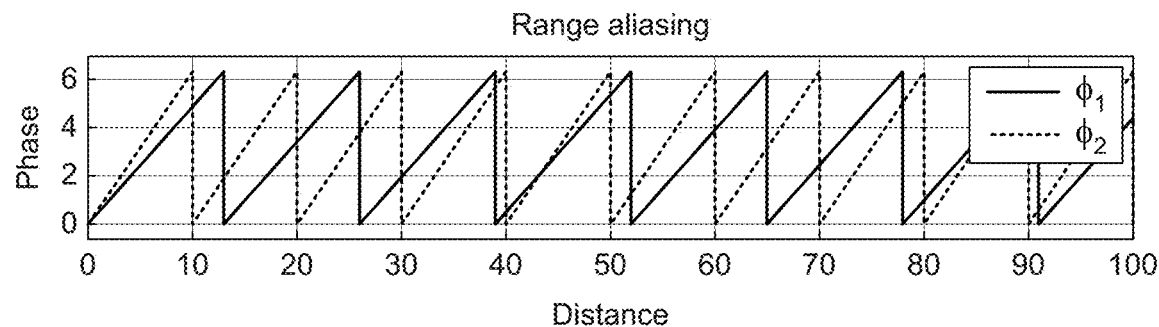
FIG. 7 is a graph of range aliasing under a second relative modulation frequency condition and prior to the de-aliasing unit of FIG. 2.
Figure 8:
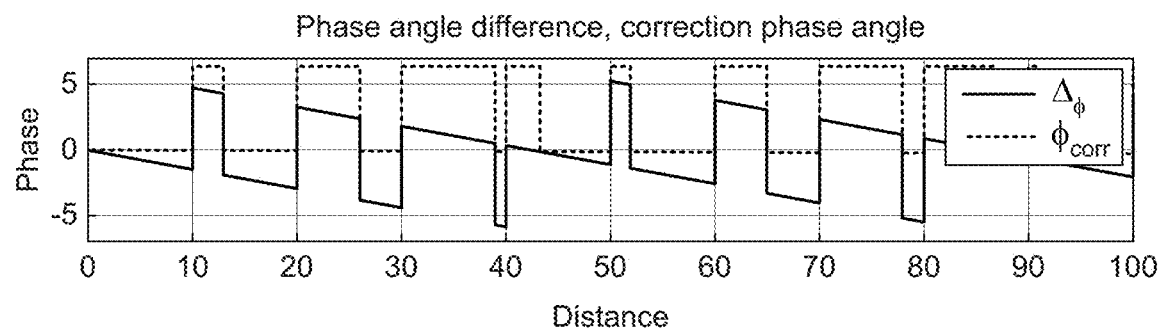
FIG. 8 is a graph of phase angle differences and correction phase angles under the second relative modulation frequency condition.
Figure 9:
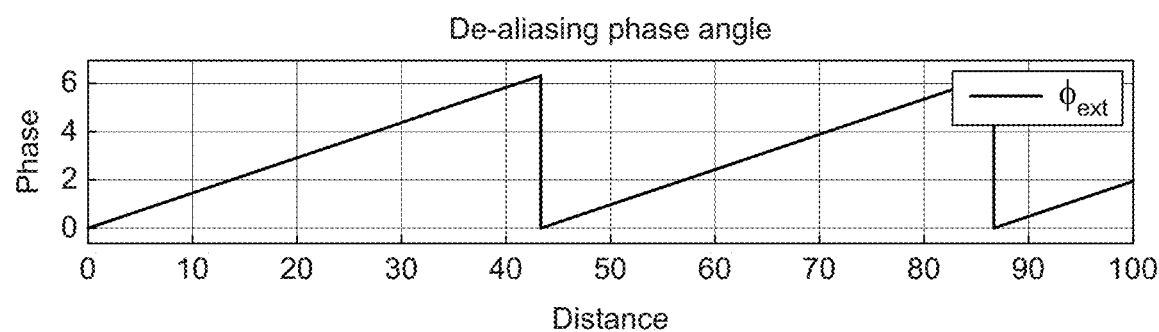
FIG. 9 is a graph of a de-aliased phase angle generated by the de-aliasing unit of FIG. 2 under the second relative modulation frequency condition.

Now, taking the second use case where $UR_1$ is greater than $UR_2$ (FIGS. 7 to 9), the phase angle difference, $\Delta\varphi$, increases with d over the extended unambiguous range, $UR_{ext}$, and $\Delta k$ of equation (4) again tracks the difference in wrapping states of the first extracted phase angle, $\varphi_1$, and the second extracted phase angle, $\varphi_2$. $\Delta k$ therefore repeats or toggles its integer value in accordance with whether both or only one of the extracted phase angles has wrapped. In this example, $\Delta k$ is unity (negative), although the magnitude of $\Delta k$ can be greater than unity in other examples where the magnitude of the highest modulation frequency is more than twice the magnitude of the lowest modulation frequency employed. From FIG. 7, though, it can be seen that the second extracted phase angle, $\varphi_2$, now wraps around before the first extracted phase angle, $\varphi_1$. As such, and referring to FIG. 8, where the second extracted phase angle, $\varphi_2$, has wrapped, but the first extracted phase angle, $\varphi_1$, has not yet wrapped, the phase angle difference, $\Delta\varphi$, is shifted by $+2\pi$. Consequently, using this information concerning the $+2\pi$ shift, the extended phase angle, $\varphi_{ext}$, is calculated as follows:

$$\varphi_{ext} = \begin{cases} -\Delta\varphi, & \text{if } \Delta\varphi < 0 \\ -\Delta\varphi + 2\pi, & \text{else} \end{cases} \quad (8)$$

The extended phase angle, $\varphi_{ext}$, is therefore again calculated by applying a correction angle, $\varphi_{corr}$, to the negative of the calculated phase angle difference, $\Delta\varphi$, ($\varphi_{ext} = -\Delta\varphi + \varphi_{corr}$), where the correction angle, $\varphi_{corr}$, is:

$$\varphi_{corr} = \begin{cases} 0, & \text{if } \Delta\varphi < 0 \\ 2\pi, & \text{else} \end{cases} \quad (9)$$

In both use cases, the wrap around points are easily identified by comparison with zero. However, as a precaution for implementations where the extracted phase angles calculated are noisy, a phase angle wrapping threshold, constituting a decision threshold, $C_\varphi$, can instead be employed and set to a suitable value slightly above or below zero, depending upon the relative magnitudes of the first and second modulation frequencies, to facilitate identification of wrapping of extracted phase angles reliably.

Referring back to FIG. 4 and with particular reference to FIG. 2, the first and second extracted phase angles, $\varphi_1$, $\varphi_2$, are received at the first phase angle input 132 and the second phase angle input 136 of the range de-aliasing unit 134, respectively, following generation by the arctan unit 124. Of course, as the first and second extracted phase angles, $\varphi_1$, $\varphi_2$, are generated serially due to the alternating nature of the setting of the modulation frequency of the emitted optical signal and the first and second electrical signals, one of the first and second extracted phase angles, $\varphi_1$, $\varphi_2$, is buffered by the arctan unit 124 until both of the first and second extracted phase angles, $\varphi_1$, $\varphi_2$, are received for processing.

In this regard, once both the first and second extracted phase angles, $\varphi_1$, $\varphi_2$, are received, a control signal is received indicating whether the first unambiguous range, $UR_1$, is less than the second unambiguous range, $UR_2$. For the sake of simplicity and clarity of description, evaluation of this inequality is not described herein. However, the skilled person will appreciate that another functional module of the signal processing circuitry of the detection and ranging module of the apparatus 100 performs, in this example, such an evaluation and to provide the control signal.

In response to the control signal, the first and second input selectors 144, 146 are actuated to connect either the first extracted phase angle, $\varphi_1$, to the positive input of the first summation unit 148 and the second extracted phase angle, $\varphi_2$, to the negative input of the first summation unit 148, or the first extracted phase angle, $\varphi_1$, to the negative input of the first summation unit 148 and the second extracted phase angle, $\varphi_2$, to the positive input of the first summation unit 148. In this regard, it can therefore be seen that the correction angle, $\varphi_{corr}$, and the manner of correction is dependent upon the outcome of the comparison of the aliasing parameters ($f_{mod_1}$ vs $f_{mod_2}$, or $UR_1$ vs $UR_2$) described above and that yield the control signal.

Subtraction of the first and second extracted phase angles is then performed by the first summation unit 148 in accordance with the appropriate use case described above, depending upon the evaluation of the unambiguous range inequality as described above. In this regard, the control signal is used to select the minuend of the subtraction operation performed by the first summation unit 148, the selection being based upon the outcome of the comparison of the aliasing parameters mentioned above. The first summation unit 148 therefore generates the difference (Step 208) between the phase angles, $\Delta\varphi$, according to the relevant use case determined by evaluating whether $UR_1$ is less than $UR_2$. The phase angle difference, $\Delta\varphi$, calculated is then compared with the decision threshold, $C_\varphi$, by the comparator 152 in order to identify (Step 210) whether the phase angle difference, $\Delta\varphi$, has reached a wrapping point. If the phase angle difference, $\Delta\varphi$, is at or has exceeded the wrapping point, it is necessary to add $2\pi$ to the phase angle difference, $\Delta\varphi$. To achieve this, the comparator 152 provides a binary output of either logic 0 or logic 1 depending upon whether or not the phase angle difference, $\Delta\varphi$, is less than the decision threshold, $C_\varphi$. In the event that the phase angle difference, $\Delta\varphi$, is less than the decision threshold, $C_\varphi$, the comparator 152 generates a logic 1 at the output thereof, otherwise the comparator 152 generates a logic 0. The multiplier unit 154 multiplies the output of the comparator 152 with $2\pi$ at the second input thereof. The result of the multiplication by the multiplier unit 154 is passed to the second summation unit 150. In the event that the comparator generates a logic 1, then the output of the multiplier unit 154 is $2\pi$ (Step 212), otherwise the output is 0 (Step 214). As such, $2\pi$ is selectively added (Step 216) to the phase angle difference, $\Delta\varphi$, depending upon whether the phase angle difference, $\Delta\varphi$, is less than the decision threshold, $C_\varphi$, in the case of the first use case, or greater than or equal to the decision threshold, $C_\varphi$. The second summation unit 150 either adds $2\pi$ to the phase angle difference, $\Delta\varphi$, or 0 to yield the extended phase angle, $\varphi_{ext}$, which is output (Step 218) at the extended phase angle output 142. Using the extended (de-aliased) phase angle, $\varphi_{ext}$, calculated by the range de-aliasing unit 134, the apparatus 100 subsequently calculates the de-aliased range to the object using the known relationship between phase angle (the extended phase angle, $\varphi_{ext}$, in this example), unambiguous range and distance, and therefore scales the extended unambiguous range corresponding to the extended phase angle, $\varphi_{ext}$, using the extended phase angle, (ext.

The above steps (Steps 202 to 218) are repeated until range measurements are no longer required.

As the range of the first and second phase angles, $\varphi_1$, $\varphi_2$, is between 0 and $2\pi$, in another example the range of phase angles can be mapped onto, and hence represented by, an n-bit binary word, having values between 0 and $2^n-1$. As a result of this mapping, the calculation of the phase angle difference, $\Delta\varphi$, is a modulo $2\pi$ arithmetic operation and so the correction angle, $\varphi_{corr}$, of the previous example does not need to be applied. As such, the computation of the extended phase angle, $\varphi_{ext}$, is simplified to:

$$\varphi_{ext} = \begin{cases} \Delta\varphi = \varphi_1 - \varphi_2, & UR_1 < UR_2 \\ -\Delta\varphi = \varphi_2 - \varphi_1, & UR_1 > UR_2 \end{cases} \quad (10)$$

Figure 10:
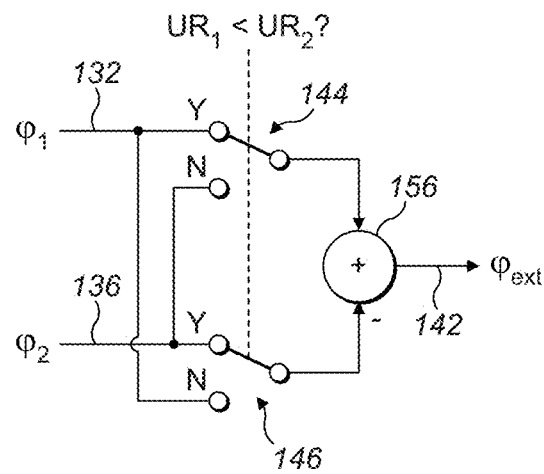
FIG. 10 is a schematic diagram of an alternative de-aliasing unit to that of FIG. 2 constituting yet another embodiment of the invention.

Referring to FIG. 10, this computation of the extended phase angle, $\varphi_{ext}$, using the phase angle mapping to n-bit binary words is implemented by the arctan unit 124 generating the first and second phase angles, $\varphi_1$, $\varphi_2$, using the calculated I and Q value results obtained from the DFT unit 110.

The range de-aliasing unit 134, in this example, comprises the first input selector 144 having the first input, the second input and the output. The range de-aliasing unit 134 also comprises the second input selector 146 also having the first input, the second input and the output. The first input of the first input selector 144 is coupled to the first phase angle input 132 of the range de-aliasing unit 134, and the second input of the first input selector 144 is coupled to the second phase angle input 136. The first input of the second input selector 146 is coupled to the second phase angle input 136, and the second input of the second input selector 146 is coupled to the first phase angle input 132. The first and second input selectors are coupled to the unambiguous range comparison result input 138. The output of the first input selector 144 is coupled to a first, positive, input of a third, digital, summation unit 156, and the output of the second input selector 146 is coupled to a second, negative, input of the third, digital, summation unit 156. An output of the third summation unit 148 is coupled to the extended phase angle output 142 of the range de-aliasing unit 134.

Figure 11:
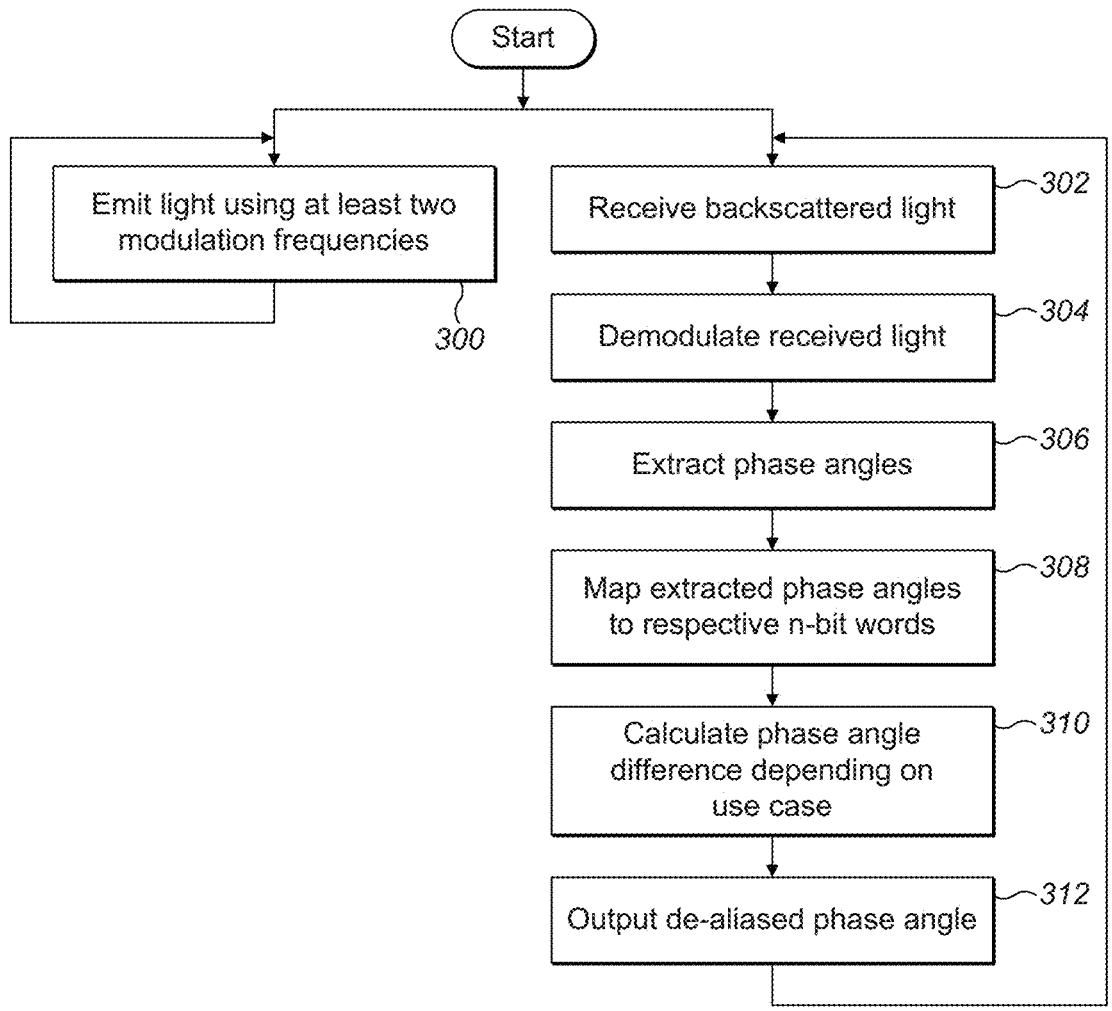
FIG. 11 a flow diagram of another method of extending a measurable range performed by the apparatus of FIGS. 1 and 10 and constituting a further embodiment of the invention.

With reference to FIG. 11, the apparatus of FIGS. 1 and 10 operate as follows.

As described above in relation to the previous example, the light source emits (Step 300) continuous wave optical signals that illuminate a scene. In this example, the light source emits an alternating order of optical signals: the first optical signal at the first modulation frequency followed by the second optical signal at the second modulation frequency.

At least one object in the scene reflects the emitted optical signals at the different the modulation frequencies. In this regard, the light at the first modulation frequency and the light at the second modulation frequency are respectively backscattered (Step 302) from the object in the scene and received (Step 302) by the photonic mixer device or cell 102.

Applying the phase offset electrical signals in the manner described above, the first and second backscattered light received by the photonic mixer device 102 is demodulated (Step 304) and passed to the DFT unit 110, the DFT unit 110 calculating the I- and Q-values for the fundamental frequency in respect of the received first light and then the received second light, which are provided by the DFT unit 110 at the outputs thereof. The arctan unit 124 then, in accordance with the indirect time of flight measurement technique, calculates (Step 306) the first angle of the first vector, $V_1$, in respect of the received first light constituting the first extracted (measured) calculated phase angle, $\varphi_1$, in the complex plane from the fundamental frequency I and Q values, and then the second angle of the second vector, $V_2$, in respect of the received second light constituting the second extracted (measured) calculated phase angle, $\varphi_2$, in the complex plane from the fundamental frequency I and Q values.

However, in this example, the arctan unit 124 additionally represents the calculated first and second phase angles, $\varphi_1$, $\varphi_2$, in the expected range of 0 to $2\pi$, as a discrete n-bit number, i.e. using a predetermined n-bit quantisation space for example an 8-bit quantisation space, and provides them to the range de-aliasing unit 134 having an architecture as shown in FIG. 10. In this example, instead of assessing the phase angle difference, $\Delta\varphi$, calculated with respect to a threshold in order to determine whether or not the correction angle, $\varphi_{corr}$, is required, the phase angle difference, $\Delta\varphi$, is simply calculated as no correction is required in relation to wrapping of the first and second phase angles, $\varphi_1$, $\varphi_2$, because the subtraction operation using the first and second quantised first and second phase angles, $\varphi_1$, $\varphi_2$, inherently applies the correction angle, $\varphi_{corr}$.

As such, the first and second extracted phase angles, $\varphi_1$, $\varphi_2$, are received at the first phase angle input 132 and the second phase angle input 136 of the range de-aliasing unit 134, respectively, following generation by the arctan unit 124. Of course, as the first and second extracted phase angles, $\varphi_1$, $\varphi_2$, are generated serially due to the alternating nature of the modulation frequency of the emitted optical signal and the first and second electrical signals, one of the first and second extracted phase angles, $\varphi_1$, $\varphi_2$, is buffered by the arctan unit 124 until both of the first and second extracted phase angles, $\varphi_1$, $\varphi_2$, are received for processing.

In this regard, once both the digitised first and second extracted phase angles, $\varphi_1$, $\varphi_2$, are received, the control signal is received, in alike manner to that described above in relation to the previous example, indicating whether the first unambiguous range, $UR_1$, is less than the second unambiguous range, $UR_2$. Again, for the sake of simplicity and clarity of description, evaluation of this inequality is not described herein.

In response to the control signal, the first and second input selectors 144, 146 are actuated to connect either the first extracted phase angle, $\varphi_1$, to the positive input of the third digital summation unit 156 and the second extracted phase angle, $\varphi_2$, to the negative input of the third summation unit 156, or the first extracted phase angle, $\varphi_1$, to the negative input of the third summation unit 156 and the second extracted phase angle, $\varphi_2$, to the positive input of the third summation unit 156. Subtraction (Step 310) of the first and second extracted phase angles is then performed by the third summation unit 156 in accordance with the appropriate use case described above, depending upon the evaluation of the unambiguous range inequality also as described above. In this regard, the control signal is used to select the minuend of the subtraction operation performed by the third summation unit 156, the selection being based upon the outcome of the comparison of the aliasing parameters mentioned above. The third summation unit 156 therefore generates the difference between the phase angles, $\Delta\varphi$, according to the relevant use case determined by evaluating whether $UR_1$ is less than $UR_2$. The phase angle difference, $\Delta\varphi$, calculated is then used as the extended, de-aliased, phase angle, $\varphi_{ext}$, which is output (Step 312) at the extended phase angle output 142. Using the extended (de-aliased) phase angle, $\varphi_{ext}$, calculated by the range de-aliasing unit 134, the signal processing circuitry of the apparatus 100 subsequently calculates the de-aliased range to the object using the known relationship between phase angle (the extended phase angle, $\varphi_{ext}$, in this example), unambiguous range and distance, and therefore scales the extended unambiguous range corresponding to the extended phase angle, $\varphi_{ext}$, using the extended phase angle, $\varphi_{ext}$.

The above steps (Steps 300 to 312) are repeated until range measurements are no longer required.

Figure 12:
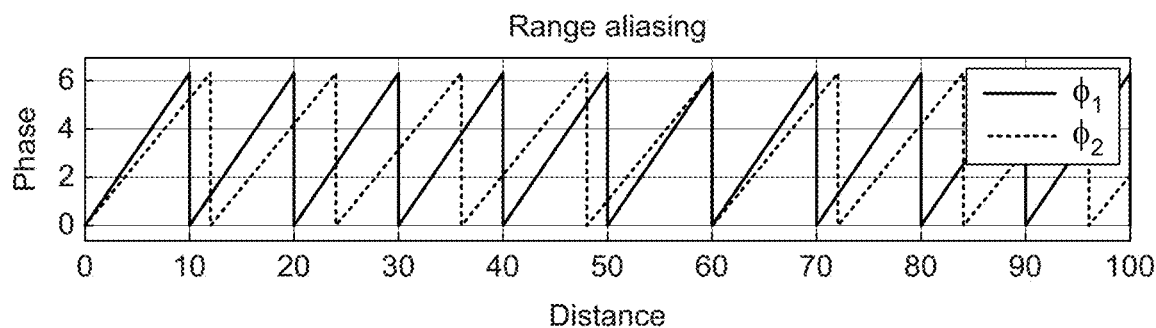
FIG. 12 is a graph of range aliasing under the first relative modulation frequency condition and prior to processing by the alternative de-aliasing unit of FIG. 10.
Figure 13:
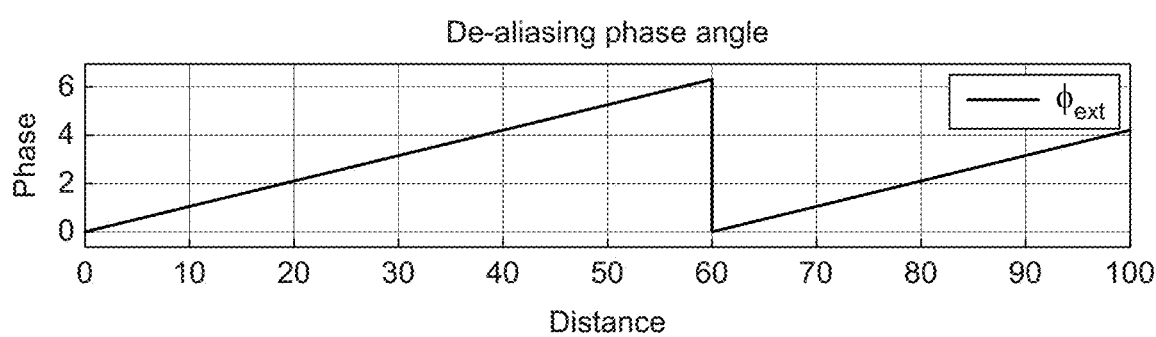
FIG. 13 is a graph of a de-aliased phase angle generated by the alternative de-aliasing unit of FIG. 10 under the first relative modulation frequency condition.

Turning to FIG. 12, in the case where $UR_1$ is less than $UR_2$, subtraction of the second phase angle, $\varphi_2$, from the first phase angle, $\varphi_1$, results in the de-aliased extended phase angle, $\varphi_{ext}$, of FIG. 13.

In another example (FIG. 14), by using a scaling technique, the noise contribution from the phase angle measurements made using the two different modulation frequencies can be averaged. This is achieved by transforming one of the first and second extracted phase angles, $\varphi_1$, $\varphi_2$, respectively having the first and second unambiguous ranges, $UR_1$, $UR_2$, associated therewith, to become a refined extended phase angle, $\varphi_{ext\_fine}$, having the extended unambiguous range, $UR_{ext}$, associated therewith. For example, the selected extracted phase angle of the first and second extracted phase angles, $\varphi_1$, $\varphi_2$, is multiplicatively compressed and then additively unwrapped and decompressed.

Figure 17:
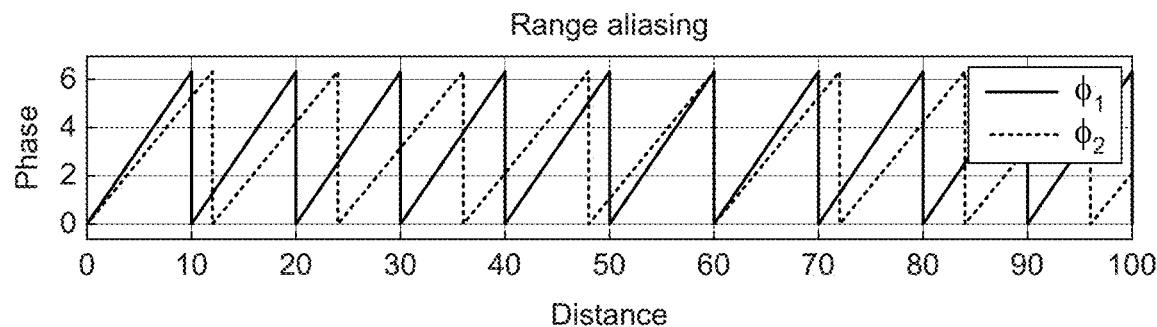
FIG. 17 is a graph illustrating range aliasing under the first relative modulation frequency condition and prior to processing by the de-aliasing unit and the phase angle refinement unit of the apparatus of FIGS. 14 and 15.

In this regard, one of the first and second unambiguous ranges, $UR_1$, $UR_2$, associated with the extended unambiguous range, $UR_{ext}$, is selected, $UR_I$, in order to calculate a refined phase angle, $\varphi_{fine}$, that tracks, in terms of wrapping and scale, the relationship between the selected unambiguous range, $UR_I$, and the extended unambiguous range, $UR_{ext}$. The refined phase angle, $\varphi_{fine}$, also possesses the same gradient as the extended phase angle, $\varphi_{ext}$, calculated in the previous examples above. The refined phase angle, $\varphi_{fine}$, constituting a compressed version of the extracted phase angle selected from the first and second extracted phase angles, $\varphi_1$, $\varphi_2$, is calculated as follows.

$$\varphi_{fine} = S\varphi_I \qquad (11)$$

where $\varphi_I$ is the phase angle selected from the first and second phase angles, $\varphi_1$, $\varphi_2$, (FIG. 17) and corresponding to one of the first and second unambiguous ranges, $UR_1$, $UR_2$. S is a scaling factor, constituting a compression ratio, which is a constant of proportionality in equation (11) above and defined by the following ratio.

$$S = \frac{UR_1}{UR_{ext}} \qquad (12)$$

Figure 18:
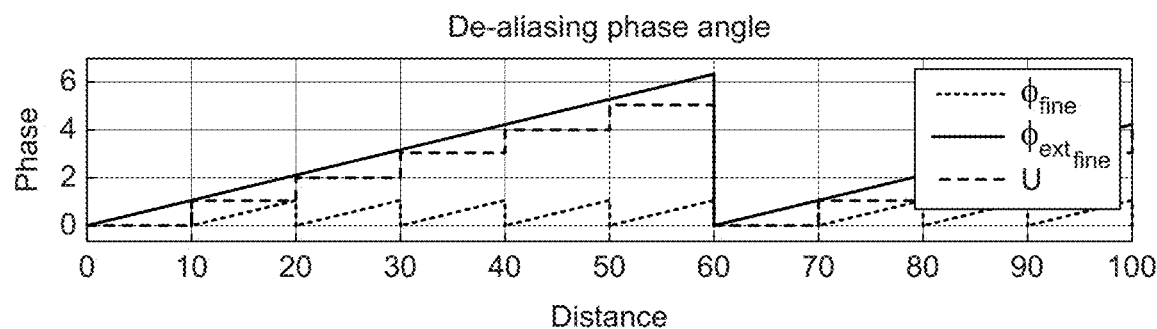
FIG. 18 is a graph of a de-aliased phase angle generated by the apparatus of FIG. 14 under the first relative modulation frequency condition.

For example, and referring to FIG. 18, selection of the first unambiguous range, $UR_1$, and the first extracted phase angle, $\varphi_1$, still results in the refined phase angle, $\varphi_{fine}$, wrapping as indicated above (indeed, it should be appreciated that wrapping of the refined phase angle, $\varphi_{fine}$, similarly occurs if the second unambiguous range, $UR_2$, and the second extracted phase angle, $\varphi_2$, are selected, but follows the wrapping of the second extracted phase angle, $\varphi_2$). As such, it is necessary to adapt the refined phase angle, $\varphi_{fine}$, in the following manner in order to arrive at a refined extended phase angle, $\varphi_{ext\_fine}$.

$$\varphi_{ext\_fine} = \varphi_{fine} + 2\pi SU \qquad (13)$$

where U is defined as follows.

$$U = \text{nint}\left[\frac{\varphi_{ext} - \varphi_{fine}}{2\pi S}\right] \quad (14)$$

where nint is a function that rounds to the nearest integer value of the result of the evaluation in the square parenthesis, and yields, U, the number of the wrapping replica of the refined phase angle, $\varphi_{fine}$, constituting a wrap repeat number of the selected extracted phase angle, $\varphi_I$, corresponding to the received light scattered by the object. This approach serves to remove the noise contribution of the extended phase angle, $\varphi_{ext}$, while scaling the noise contribution of the selected extracted phase angle, $\varphi_I$, by the scaling factor, S.

Although in the above example, unambiguous ranges are used to calculate the scaling factor, S, the scaling factor, S, can alternatively be calculated by evaluating a quotient of a difference between the first and second modulation frequencies and a selected modulation frequency.

Figure 14:
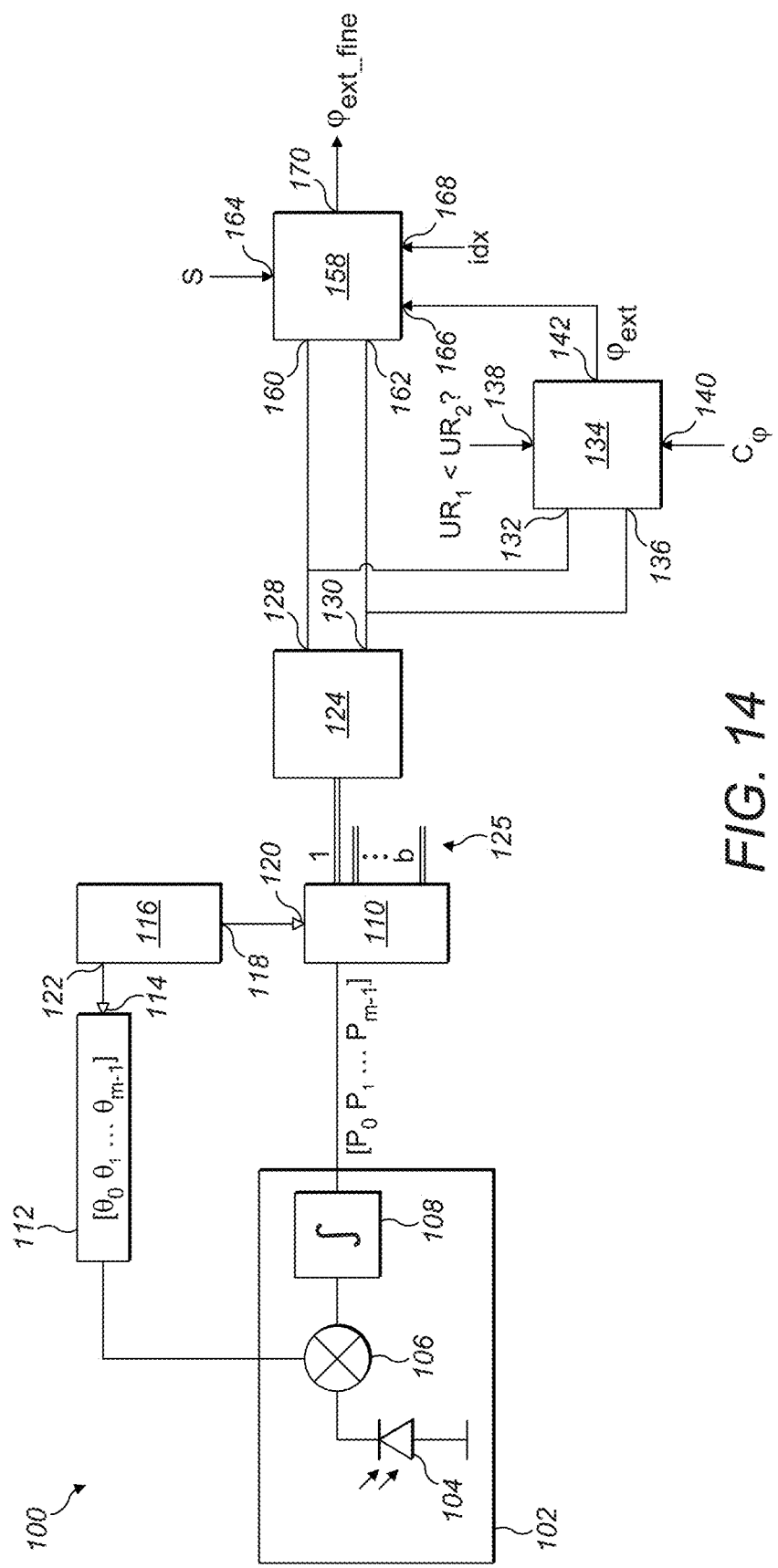
FIG. 14 is a schematic diagram of another optical range calculation apparatus constituting another embodiment of the invention.

Referring to FIG. 14, in order to implement the above technique, the apparatus 100 of FIG. 1 is adapted so that in addition to the range de-aliasing unit 134, the signal processing circuitry also supports a phase angle refinement unit 158. The phase angle refinement unit 158 comprises a first phase angle input 160 and a second phase angle input 162. In a like manner to the range de-aliasing unit 134, the first phase angle input 160 of the phase angle refinement unit 158 is coupled to the first phase angle output 128 of the arctan unit 124 and the second phase angle input 162 of the phase angle refinement unit 158 is coupled to the second phase angle output 130 of the arctan unit 124. The phase angle refinement unit 158 also comprises a scaling factor input 164 and an extended phase angle input 166, the extended phase angle input 166 being coupled to the extended phase angle output 142 of the range de-aliasing unit 134. The phase angle refinement unit 158 further comprises a modulation frequency index input 168 and a refined extended phase angle output 170.

Figure 15:
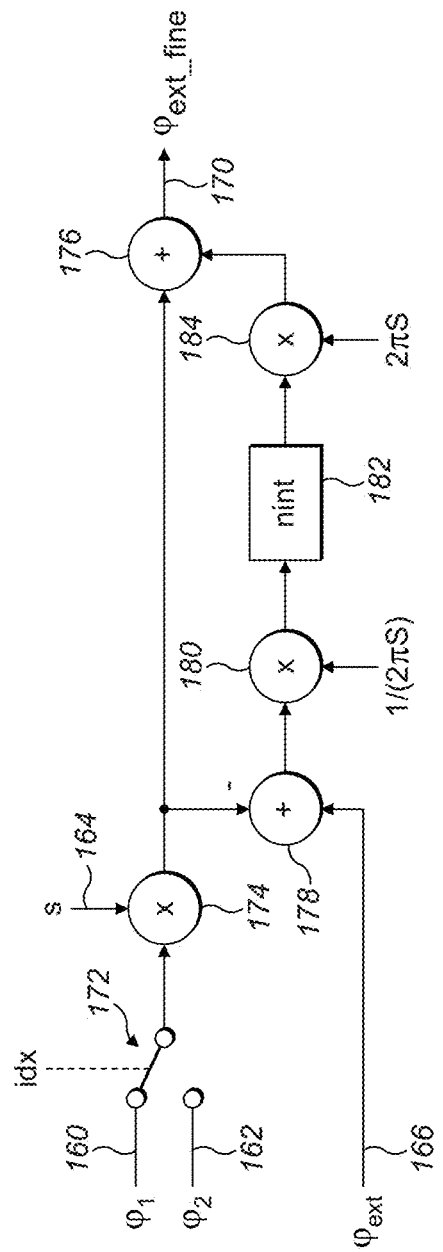
FIG. 15 is a schematic diagram of a phase angle refinement unit of FIG. 14.

Turning to FIG. 15, the phase angle refinement unit 158 comprises a third input selector 172 having a first input, a second input and an output. The third selector 172 is also operable coupled to the modulation frequency index input 168. The first input of the third input selector 172 is coupled to the first phase angle input 160 and the second input of the third input selector 172 is coupled to the second phase angle input 162. The output of the third input selector 172 is coupled to a first input of a second multiplier unit 174, a second input of the second multiplier unit 174 being coupled to the scaling factor input 164. An output of the second multiplier unit 174 is coupled to a first input of a fourth summation unit 176, an output of the fourth summation unit 176 being coupled to the refined extended phase angle output 170. The output of the second multiplier unit 174 is also coupled to a negative input of a fifth summation unit 178 serving as a subtractor. A positive input of the fifth summation unit 178 is coupled to the extended phase angle input 166. An output of the fifth summation unit 178 is coupled to a first input of a third multiplier unit 180, a second input of the third multiplier unit 180 being coupled to a source (not shown) providing a constant $1/(2\pi S)$ output value. An output of the third multiplier unit 180 is operably coupled to a nearest integer calculation unit 182, an output of the nearest integer calculation unit 182 being coupled to an input of a fourth multiplier unit 184. A second input of the fourth multiplier unit 184 is coupled to another source (not shown) providing a constant $2\pi S$ output value. An output of the fourth multiplier unit 184 is coupled to a second input of the fourth summation unit 176.

Figure 19:
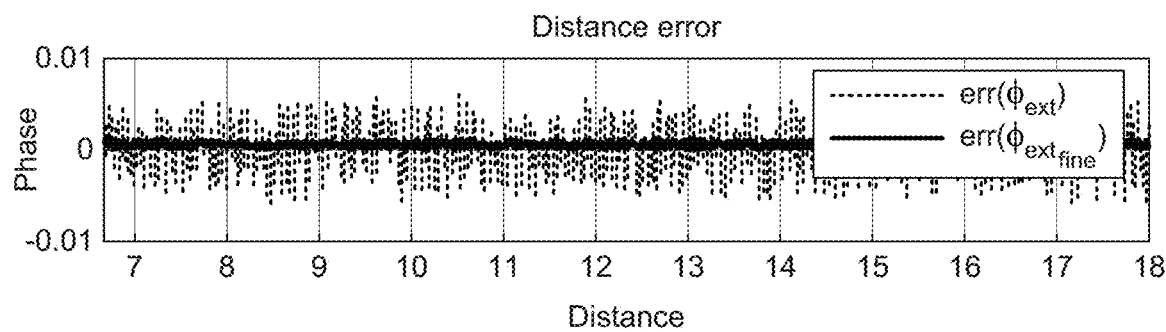
FIG. 19 is a graph of comparing errors in distance based upon extended range phase angles calculated by the apparatus of FIG. 1 and refined extended phase angles calculated by the apparatus of FIG. 14.

In operation (FIG. 16), the extended phase angle, $\varphi_{ext}$, is calculated as described above in relation to one of the previous examples pertaining to FIG. 1. In this example, however, one of the first and second extracted phase angles, $\varphi_1$, $\varphi_2$, and the extended phase angle, $\varphi_{ext}$, calculated by the range de-aliasing unit 134 are used in order to calculate the refined extended phase angle, ($\varphi_{ext\_fine}$, in accordance with equations (11) to (14) and FIGS. 17 to 19. In this regard, the phase angle refinement unit 158 receives (Step 400) the first and second extracted phase angles, $\varphi_1$, $\varphi_2$, from the arctan unit 124 and the extended phase angle, $\varphi_{ext}$, from the range de-aliasing unit 134. As described in further detail below, the phase angle refinement unit 158 also receives an identification of a selection of one of the first and second phase angles, $\varphi_1$, $\varphi_2$. The selection is an implicit selection of the corresponding unambiguous range, $UR_I$, associated therewith. Although not shown, the signal processing circuitry of FIG. 1 is configured to select (Step 402) the unambiguous range, $UR_I$, and the extracted phase angle, $\varphi_I$, and to calculate (Step 404) the scaling factor, S, in accordance with equation (12) and stored for subsequent use, using the extended unambiguous range, $UR_{ext}$, corresponding to the extended phase angle, (ext. Thereafter, for subsequent extended phase angle, $\varphi_{ext}$, calculations, the scaling factor, S, is simply retrieved from storage instead of being repeatedly calculated and so Step 404 is typically only performed once in this example.

The selection of the first or second extracted phase angle, $\varphi_1$, $\varphi_2$, as the selected extracted phase angle, $\varphi_I$, is applied at the modulation frequency index input 168 and the calculated scaling factor, S, is applied at the scaling factor input 164. As a result of the signal applied to the modulation frequency index input 168, either the first extracted phase angle, $\varphi_1$, or the second extracted phase angle, $\varphi_2$, is applied to the first input of the second multiplier unit 174, the scaling factor, S, calculated and applied to the scaling factor input 164 being applied to the second input of the second multiplier unit 174. The selected extracted phase angle, $\varphi_I$, is therefore multiplied (Step 406) by the scaling factor, S, in order to yield the refined phase angle, $\varphi_{fine}$, in accordance with equation (11). Thereafter, the refined phase angle, $\varphi_{fine}$, is used to calculate (Step 408) the wrapping replica number, U, according to equation (14). In this regard, the fifth summation unit 178 subtracts (Step 410) the refined phase angle, $\varphi_{fine}$, calculated from the extended phase angle, $\varphi_{ext}$, the result of which is multiplied (Step 412) by $1/(2\pi S)$ by the third multiplier unit 180. The result of the multiplication is then processed (Step 414) by the nearest integer calculation unit 182 in order to calculate the nearest integer value to the value received and therefore the wrapping replica number, U. As set out in equation (13), the wrapping replica number, U, is then multiplied (Step 416) by $2\pi S$, by the fourth multiplier unit 184 to yield a scaled translation value, which is summed (Step 418) by the fourth summation unit 176 with the refined phase angle, (fine, calculated by the second multiplier unit 174 to yield the refined extended phase angle, $\varphi_{ext\_fine}$, which is de-aliased. In this regard, the wrapping replica number, U, is used in combination with the scaled uppermost angular range value ($2\pi S$) to additively translate the refined phase angle, $\varphi_{fine}$, and therefore unwrap the refined phase angle, $\varphi_{fine}$, which although possessing the same gradient as the refined phase angle, $\varphi_{fine}$, still wraps as implied above. The refined extended phase angle, $\varphi_{ext\_fine}$, is then provided (Step 420) at the refined extended phase angle output 170. As can be seen from FIG. 19, the refined extended phase angle, $\varphi_{ext\_fine}$, signal is less noisy than the extended phase angle, $\varphi_{ext}$, signal. Using the refined extended phase angle, $\varphi_{ext\_fine}$, calculated by the phase angle refinement unit 158, the apparatus 100 subsequently calculates the de-aliased range to the object using the known relationship between phase angle (the refined extended phase angle, $\varphi_{ext\_fine}$, in this example), unambiguous range and distance, and therefore scales the extended unambiguous range corresponding to the refined extended phase angle, $\varphi_{ext\_fine}$, using the refined extended phase angle, $\varphi_{ext\_fine}$.

The above steps (Steps 400 to 418) are repeated until range measurements are no longer required.

In another example, the above-described mapping of the phase angle ranges to n-bit binary values can be employed, thereby simplifying the scaling operation performed by the second multiplier 174 to a bit shift operation.

In the above embodiment, one of either the first or second extracted phase angle, $\varphi_1$, $\varphi_2$, is employed to calculate the refined extended phase angle, $\varphi_{ext\_fine}$, based upon whether the first unambiguous range, $UR_1$, associated with the first extracted phase angle, $\varphi_1$, is less than or greater than the second unambiguous range, $UR_2$, associated with the second extracted phase angle, $\varphi_2$. The SNR of the de-aliased extended phase angle, $\varphi_{ext\_fine}$, calculated in the above embodiment is considerably greater than the SNR of a phase angle measurement made in respect of a low frequency modulation signal. The use of lower frequency modulation signals translates to unambiguous ranges over longer distances. A limiting factor of a fine-grained distance calculated from the refined extended phase angle, $\varphi_{ext\_fine}$, signal within the extended unambiguous range, $UR_{ext}$, is optical power. In another embodiment, the SNR of the de-aliased extended phase angle, $\varphi_{ext\_fine}$, obtained using the apparatus and method of the previous embodiment relating to FIGS. 14 to 16 can be improved by using both available extracted phase angles, $\varphi_1$, $\varphi_2$, instead of selecting one of them.

In this embodiment, the apparatus of FIG. 15 is modified so that the phase angle refinement unit of FIG. 15 comprises a first phase angle refinement circuit and a second phase angle refinement circuit. The first phase angle refinement circuit is similar to the circuit of FIG. 15, but omits the third input selector 172 and the first phase angle input 160 is coupled more directly to the second multiplier unit 174. The second phase angle refinement circuit is a duplicate of the first phase angle refinement circuit and the second phase angle input 162 is coupled to a corresponding second multiplier unit of the second phase angle refinement circuit. The extended phase angle input 166 is, in this example, operably coupled to respective positive inputs of both fifth summation units 178 of the first and second phase angle refinement circuits. As a result of the above-described adaptation, the modified phase angle refinement unit comprises the first refined extended phase angle output 170 in respect of the first phase angle refinement circuit and a second refined extended phase angle output in respect of the second phase angle refinement circuit. In this example, the first and second refined extended phase angle outputs are respectively coupled to inputs of a further summation unit, an output of the further summation unit being operably coupled to an input of a divider, which divides an input signal received by two and provides the result of the division at an output thereof. The output of the divider constitutes a combined extended phase angle, $\varphi_{ext\_fine\_comb}$, output.

In operation, instead of a single scaling factor, S, the signal processing circuitry of FIG. 14 is configured to calculate a first scaling factor, $S_1$, in respect of the first extracted phase angles, $\varphi_1$, and a second scaling factor, $S_2$, in respect of the second extracted phase angles, $\varphi_2$, both in accordance with equation (12). The first scaling factor, $S_1$, is applied in the manner described above in relation to FIG. 15 in respect of the third multiplier unit 180 and the fourth multiplier unit 184, i.e. $1/(2\pi S_1)$ and $2\pi S_1$, respectively, of the first phase angle refinement circuit. Similarly, the second scaling factor, $S_2$, is applied in a like manner in respect of the third multiplier unit and the fourth multiplier unit, i.e. $1/(2\pi S_2)$ and $2\pi S_2$, respectively, of the second phase angle refinement circuit. The first and second phase angle refinement circuits operate in a like manner to that described above in relation to FIGS. 15 and 16, but using the first and second scaling factors, $S_1$, $S_2$, described above. In a like manner to that described in relation to FIGS. 15 and 16, the first and second phase angle refinement circuits respectively generate first and second extended phase angles, $\varphi_{ext\_fine\_1}$, $\varphi_{ext\_fine\_2}$, which are averaged by the combined operation of the further summation unit coupled to the first and second refined extended phase angle outputs, respectively, and the divider to yield the combined extended phase angle, $\varphi_{ext\_fine\_comb}$, mentioned above. The apparatus and method of this embodiment benefits from both improved measurement resolution as compared with a single frequency measurement and improved SNR by approximately 30%.

As described above in relation to previous examples, the scaling performed by the first and second scaling factors, $S_1$, $S_2$, can be achieved using a bit shift operation instead of employing the third and fourth multiplier units of the first and second phase angle refinement circuits.

In yet another embodiment, employing less hardware elements than the previous embodiment, instead of duplicating the phase angle refinement circuit of FIG. 15 so that the phase angle refinement unit comprises the first and second phase angle refinement circuits, the phase angle refinement circuit of FIG. 15 is modified as follows.

Whereas the phase angle refinement circuit of FIG. 15 comprises the first and second phase angle inputs 160, 162 coupled to the second multiplier unit 174 via the third input selector 172, in this embodiment the third input selector 172 is replaced by a phase angle summation unit having inputs operably coupled to the first and second phase angle inputs 160, 162 and an output operably coupled to the second multiplier unit 174.

Figure 16:
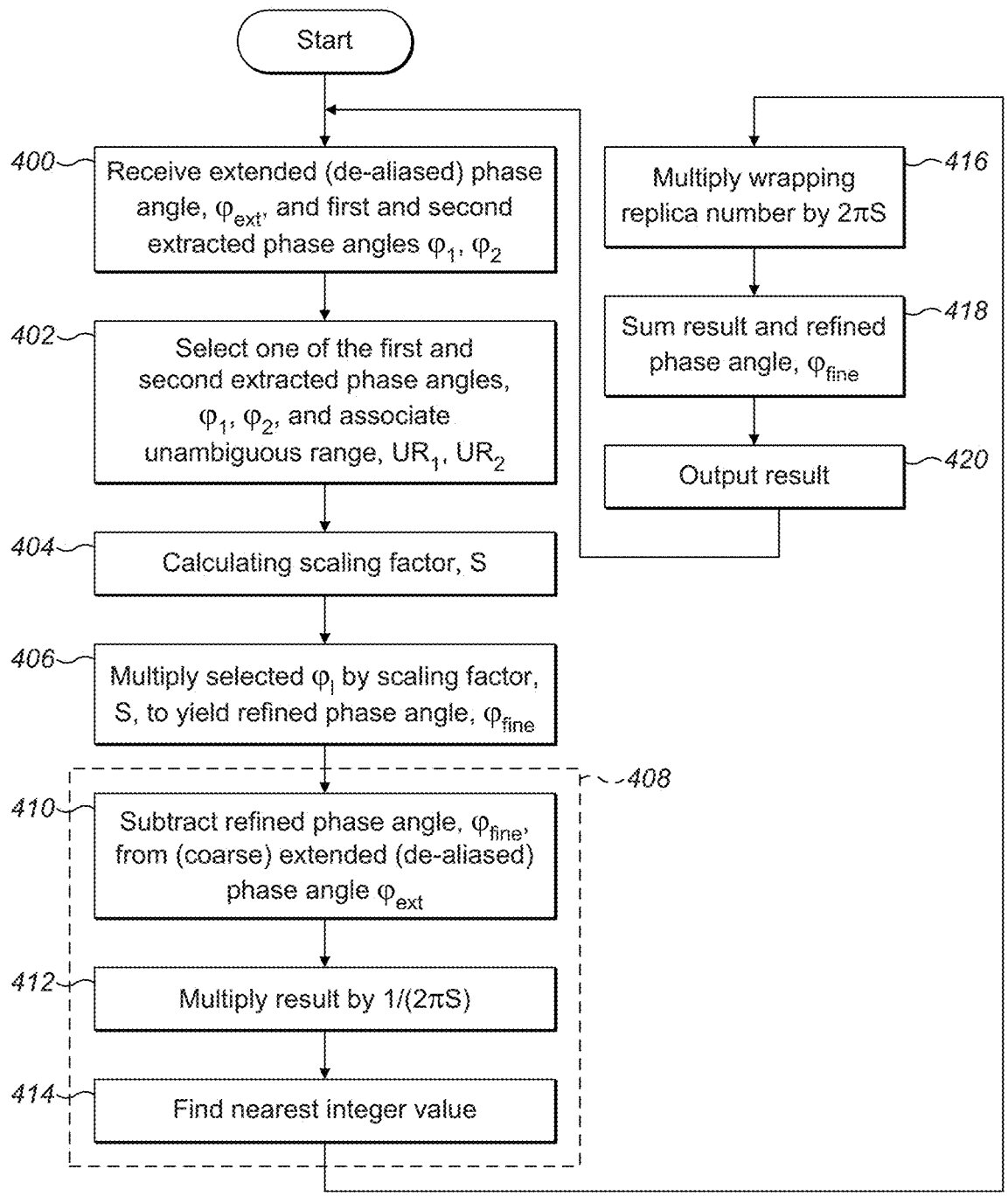
FIG. 16 is a flow diagram of a method of extending a measurable range performed by the apparatus of FIGS. 14 and 15 and constituting yet another embodiment of the invention.

In operation, instead of selecting between one of the first and second extracted phase angles, $\varphi_1$, $\varphi_2$, the first and second extracted phase angles, $\varphi_1$, $\varphi_2$, are summed by the phase angle summation unit, and the summed phase angle, $\varphi_C$ ($=(\varphi_1+\varphi_2)$), is processed by the modified phase angle refinement circuit in a like manner to the selected extracted phase angle in relation to FIGS. 15 and 16. However, the scaling factor employed is a scaling factor based upon the first and second unambiguous ranges, $UR_1$ $UR_2$, corresponding to the first and second extracted phase angles, $\varphi_1$, $\varphi_2$. In this regard, a combined unambiguous range, $UR_C$, is calculated:

$$\frac{UR_1 UR_2}{UR_1 + UR_2} = \frac{c}{2(f_{mod_1} + f_{mod_2})} \tag{15}$$

where c is the speed of light and $f_{mod1}$ and $f_{mod2}$ are the modulation frequencies of the illumination signals. The scaling factor is then calculated using the combined unambiguous range, $UR_C$:

$$S = \frac{UR_C}{UR_{ext}} \qquad (16)$$

The extended phase angle, $\varphi_{ext\_fine}$, generated by the phase angle refinement circuit is de-aliased and monotonic with distance between the system and an object located within the extended unambiguous range, $UR_{ext}$. The apparatus and method of this embodiment benefits from both improved measurement resolution as compared with a single frequency measurement and improved SNR by approximately 30%.

As in the case of the preceding embodiment, the scaling performed by the scaling factors, S, can be achieved using a bit shift operation instead of employing the third and fourth multiplier units 180, 184 of the phase angle refinement circuit.

The skilled person should appreciate that the above-described implementations are merely examples of the various implementations that are conceivable within the scope of the appended claims. Indeed, it should be appreciated that, for example, the application of the same number of phase offsets in relation each of the first electrical signal at the first modulation frequency and the second electrical signal at the second modulation frequency is not necessary and a different number of phase offsets can be applied to the first electrical signal to the number of phase offsets applied to the second electrical signal. Indeed, even if the same number or a different number of phase offsets are applied to the first and second electrical signals, the phase offset values need not be the same, or in the case of different numbers of phase offsets, need not overlap. In other implementations, the phase offsets need not be applied in the cyclic increasing order described herein and a completely different order of application of the phase offsets, in respect of each individually or both of the first and second electrical signals, can be employed.

In the above examples, the alternating generation of the first and second electrical signals comprises the complete set of the phase offsets being applied to each of the first and second electrical signals before the subsequent electrical signal in the alternating pattern is generated. However, the skilled person should appreciate that multiple alternations between the first and second electrical signal during a time frame, for shorter durations and during which only some of the full set of respective phase values are applied, can be employed. In such an implementation, remaining phase offset values are applied upon one or more subsequent generations of the first and second electrical signals, thereby effectively interleaving the first and second electrical signals and their respective applications of the set of phase angles. For example, the following pattern can be employed: $f_1/p_1$, $f_1/p_2$, $f_2/p_1$, $f_2/p_2$, $f_1/p_3$, $f_1/p_4$, $f_2/p_3$, $f_4/p_4$, $f_1/p_1$, $f_1/p_2$ .... Of course, other phase offset and/or frequency selection schemes can be employed.

In the above examples, the de-aliased extended phase angle, $\varphi_{ext}$, is generated following generation of both the first and second extracted phase angles, $\varphi_1$, $\varphi_2$. This is one possible implementation, whereby the apparatus 100 awaits generation of new first and second extracted phase angles, $\varphi_1$, $\varphi_2$, before calculating the de-aliased extended phase angle, $\varphi_{ext1}$. However, in another example, when a new phase angle, (s, is extracted, a phase angle extracted immediately preceding, $\varphi_2$, the new extracted phase angle, $\varphi_3$, can be used with the new extracted phase angle, $\varphi_3$, in order to calculate the next de-aliased extended phase angle, $\varphi_{ext2}$.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

What is claimed is:

1. An optical range calculation apparatus comprising:
a light source configured to emit light in accordance with an indirect time of flight measurement technique, the light source being configured to selectively modulate the light at a first modulation frequency and a second modulation frequency in accordance with a frequency selection scheme;
a photonic mixer cell configured to generate and store a plurality of electrical output signals respectively corresponding to phase offset values applied in accordance with the indirect time of flight measurement technique and in respect of a selected one of the first modulation frequency or the second modulation frequency; and
a signal processing circuit configured to
process a first number of the plurality of electrical output signals in respect of the first modulation frequency in order to calculate a first measurement vector and a first measurement phase angle from the first measurement vector,
process a second number of the plurality of electrical output signals in respect of the second modulation frequency in order to calculate a second measurement vector and a second measurement phase angle from the second measurement vector,
calculate a phase angle difference between the first and second measurement phase angles and apply a correction value to the phase angle difference to yield an extended range phase angle, and
calculate a de-aliased range using the extended range phase angle.

2. The optical range calculation apparatus according to claim 1, wherein the signal processing circuit is configured to apply the correction value in response to a comparison of respective aliasing parameters associated with the first modulation frequency and the second modulation frequency.

3. The optical range calculation apparatus according to claim 2, wherein the signal processing circuit is configured to compare the first modulation frequency with the second modulation frequency.

4. The optical range calculation apparatus according to claim 2, wherein
a first unambiguous measurable range is associated with the first measurement phase angle;
a second unambiguous measurable range associated with the second measurement phase angle; and
the signal processing circuit is configured to compare the first unambiguous measurable range with the second unambiguous measurable range.

5. The optical range calculation apparatus according to claim 2, wherein a calculation of the correction value is an outcome of the comparison of the respective aliasing parameters.

6. The optical range calculation apparatus according to claim 1, wherein the signal processing circuit is configured to detect wrapping of the phase angle difference by comparison of the phase angle difference with a phase angle wrapping threshold.

7. The optical range calculation apparatus according to claim 1, wherein the signal processing circuit is configured to quantise the first measurement phase angle as a first n-bit value and to quantise the second measurement phase angle as a second n-bit value, the first and second n-bit values being within an n-bit space representing an angular range between substantially 0 and substantially 2n over the n-bit space; and the signal processing circuit is configured to calculate the phase angle difference and to apply the correction value to the phase angle difference simultaneously by performing a subtraction operation using the quantised first measurement phase angle and the quantised second measurement phase angle.

8. The optical range calculation apparatus according to claim 2, wherein the signal processing circuit is configured to quantise the first measurement phase angle as a first n-bit value and to quantise the second measurement phase angle as a second n-bit value, the first and second n-bit values being within an n-bit space representing an angular range between substantially 0 and substantially 2n over the n-bit space;

the signal processing circuit is configured to calculate the phase angle difference and to apply the correction value to the phase angle difference simultaneously by performing a subtraction operation using the quantised first measurement phase angle and the quantised second measurement phase angle; and the signal processing circuit is configured to select the first measurement phase angle or the second measurement phase angle as a minuend of the subtraction operation based on a value of an outcome of the comparison of the respective aliasing parameters.

9. The optical range calculation apparatus according to claim 1, wherein the extended range phase angle has an unambiguous extended range, the unambiguous extended range being associated with the extended range phase angle; and the signal processing circuit is configured to calculate the umambiguous extended range using the extended range phase angle by scaling the unambiguous extended range using the extended range phase angle.

10. The optical range calculation apparatus according to claim 1, wherein the signal processing circuit is configured to transform the first measurement phase angle having a first unambiguous measurable range to a refined extended phase angle having an extended unambiguous measurable range associated with the extended range phase angle, the first unambiguous measurable range being associated with the first measurement phase angle.

11. The optical range calculation apparatus according to claim 10, wherein the signal processing circuit is configured to transform the first measurement phase angle to the corresponding refined extended phase angle by compressing the first measurement phase angle, and additively translating the compressed first measurement phase angle to unwrap the compressed first measurement phase angle, the compressing of the first measurement phase angle being multiplicative.

12. The optical range calculation apparatus according to claim 11, wherein a compression ratio used to compress the first measurement phase angle is a constant of proportionality; and the signal processing circuit is configured to calculate the constant of proportionality by evaluating a ratio of the first unambiguous measurable range to the extended unambiguous measurable range.

13. The optical range calculation apparatus according to claim 12, wherein the signal processing circuit is configured to calculate a wrap repeat number of the first measurement phase angle using a difference between the compressed first measurement phase angle and the extended range phase angle; and the signal processing circuit is configured to unwrap the compressed first measurement phase angle using the wrap repeat number.

14. The optical range calculation apparatus according to claim 13, wherein the signal processing circuit is configured to unwrap the first measurement phase angle by adding a scaled translation value based upon the wrap repeat number, and an uppermost angular range value scaled by the constant of proportionality.

15. The optical range calculation apparatus according to claim 1, wherein the signal processing circuit is configured to transform the first measurement phase angle having a first unambiguous measurable range associated therewith to a first refined extended phase angle having a first extended unambiguous measurable range associated with the extended range phase angle;

the signal processing circuit is configured to transform the second measurement phase angle having a second unambiguous measurable range associated therewith to a second refined extended phase angle having a second extended unambiguous measurable range associated with the extended range phase angle; and the signal processing circuit is configured to calculate an average of the first and second refined extended phase angles.

16. The optical range calculation apparatus according to claim 15, wherein the signal processing circuit is configured to transform the first and second measurement phase angles to the corresponding first and second refined extended phase angles by respectively compressing multiplicatively the first and second measurement phase angles, and additively translating the compressed first and second compressed measurement phase angles, respectively, thereby unwrapping the first and second compressed measurement phase angles.

17. The optical range calculation apparatus according to claim 1, wherein the signal processing circuit is configured to sum the first and second measurement phase angles prior to transforming the summed first and second measurement phase angles to a refined extended phase angle having an extended unambiguous measurable range associated with the extended range phase angle.

18. The optical range calculation apparatus according to claim 17, wherein the signal processing circuit is configured to transform the sum of t first and second measurement phase angles to the corresponding refined extended phase angle by compressing the sum of the first and second measurement phase angles, and additively translating the compressed sum of the first and second measurement phase angles to unwrap the compressed sum of the first and second measurement phase angles, the compressing of the sum of the first and second measurement phase angles being multiplicative.

19. The optical range calculation apparatus according to claim 18, wherein
- apparatus according to a compression ratio used to compress the sum of the first and second measurement phase angles is a constant of proportionality; and
- the signal processing circuit is configured to calculate the constant of proportionality by calculating a combined unambiguous measurable range in respect of the sum of the first and second measurement phase angles and evaluating a ratio of the combined unambiguous measurable range to the extended unambiguous measurable range.

20. A method of extending a measurable range of an optical range calculation apparatus, the method comprising:
- a light source emitting light in accordance with an indirect time of flight measurement technique, the light source selectively modulating the light at a first modulation frequency and a second modulation frequency in accordance with a frequency selection scheme;
- generating and storing, via a photonic mixer cell, a plurality of electrical output signals respectively corresponding to phase offset values applied in accordance with the indirect time of flight measurement technique and in respect of a selected one of the first modulation frequency or the second modulation frequency; and
- processing, via a signal processing circuit, a first number of the plurality of electrical output signals in respect of the first modulation frequency in order to calculate a first measurement vector and a first measurement phase angle from the first measurement vector, and a second number of the plurality of electrical output signals in respect of the second modulation frequency in order to calculate a second measurement vector and a second measurement phase angle from the second measurement vector; and wherein the processing includes
- calculating, via the signal processing circuit, a phase angle difference between the first and second measurement phase angles and applying a correction value to the phase angle difference to yield an extended range phase angle, and
- calculating, via the signal processing circuit, a de-aliased range using the extended range phase angle.

* * * * *